US012186768B2

(12) United States Patent
Yamaguchi

(10) Patent No.: US 12,186,768 B2
(45) Date of Patent: Jan. 7, 2025

(54) ROBOT SYSTEM PROVIDED WITH PAINTING ROBOT AND ARRANGEMENT OF FLOWMETER IN NON-EXPLOSION-SAFE AREA

(71) Applicant: KAWASAKI JUKOGYO KABUSHIKI KAISHA, Kobe (JP)

(72) Inventor: Shusaku Yamaguchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 501 days.

(21) Appl. No.: 17/610,354

(22) PCT Filed: Mar. 11, 2020

(86) PCT No.: PCT/JP2020/010468
§ 371 (c)(1),
(2) Date: Nov. 10, 2021

(87) PCT Pub. No.: WO2021/079542
PCT Pub. Date: Apr. 29, 2021

(65) Prior Publication Data
US 2022/0241809 A1    Aug. 4, 2022

(30) Foreign Application Priority Data
Oct. 25, 2019  (JP) ................. 2019-194271

(51) Int. Cl.
*B05B 12/08* (2006.01)
*B05B 13/04* (2006.01)
*B05C 11/10* (2006.01)
*B25J 11/00* (2006.01)

(52) U.S. Cl.
CPC ........ *B05B 12/085* (2013.01); *B05B 13/0431* (2013.01); *B05C 11/1002* (2013.01); *B25J 11/0075* (2013.01)

(58) Field of Classification Search
CPC ......... B05B 16/20; B05B 16/40; B05B 16/60; B05B 16/80
See application file for complete search history.

(56) References Cited

U.S. PATENT DOCUMENTS

2006/0102072 A1\* 5/2006 Inada ................ B25J 19/0029
118/300
2019/0001483 A1   1/2019 Ishizu et al.

FOREIGN PATENT DOCUMENTS

| JP | H04-244918 A | 9/1992 |
|----|--------------|--------|
| JP | 2011-025151 A | 2/2011 |
| JP | 2013-036918 A | 2/2013 |
| JP | 2017-070888 A | 4/2017 |
| JP | 2019-10695 A | 1/2019 |

(Continued)

*Primary Examiner* — Karl Kurple
(74) *Attorney, Agent, or Firm* — Oliff PLC

(57) ABSTRACT

A robot system includes a paint supply source, a sending-out device, a painting robot, a channel connecting the paint supply source to the painting robot through the sending-out device, and disposed so that a part thereof is located in a non-explosion-proof area, and a noncontact flowmeter disposed in the channel and configured to detect a flow rate of paint flowing through the channel. The painting robot and the sending-out device are disposed in an explosion-proof area, and the paint supply source and the noncontact flowmeter are disposed in the non-explosion-proof area.

6 Claims, 23 Drawing Sheets

(56) References Cited

FOREIGN PATENT DOCUMENTS

| | | |
|---|---|---|
| JP | 2019-034260 A | 3/2019 |
| KR | 101577644 B1 | 12/2015 |
| WO | 2014/081536 A1 | 5/2014 |

\* cited by examiner

ROBOT SYSTEM PROVIDED WITH PAINTING ROBOT AND ARRANGEMENT OF FLOWMETER IN NON-EXPLOSION-SAFE AREA

CROSS-REFERENCE TO RELATED APPLICATIONS

This application is a national phase of International Application No. PCT/JP2020/010468 filed Mar. 11, 2020, which claims the benefit of Japanese Patent Application No. 2019-194271 filed Oct. 25, 2019. The disclosure of the prior application is hereby incorporated by reference herein in its entirety.

TECHNICAL FIELD

The present disclosure relates to a robot system provided with a painting robot.

BACKGROUND ART

In a paint system (robot system) which paints a workpiece, such as a body of an automobile, by using a paint gun, an instrument, such as an explosion-proof flowmeter is used in consideration of a solvent atmosphere being formed by organic solvent contained in the paint (for example, see Patent Document 1). Moreover, a paint system etc. in which an explosion-proof flowmeter is disposed in an explosion-proof area is known (for example, see Patent Documents 2 to 4).

REFERENCE DOCUMENTS OF CONVENTIONAL ART

Patent Documents

[Patent Document 1] JP2019-034260A
[Patent Document 2] JP2013-036918A
[Patent Document 3] JP2011-025151A
[Patent Document 4] JP1992-244918A

DESCRIPTION OF THE DISCLOSURE

Problems to be Solved by the Disclosure

However, there is a problem that the explosion-proof flowmeter is expensive, and the apparatus cost becomes high. In addition, since the flowmeter is disposed in the explosion-proof area, there is a problem that the maintenance becomes difficult.

The present disclosure is made in view of solving the above-described conventional problems, and one purpose thereof is to provide a robot system capable of reducing the cost of a system and making the maintenance easier.

SUMMARY OF THE DISCLOSURE

In order to solve the problems, a robot system according to the present disclosure includes a paint supply source, a sending-out device, a painting robot, a channel connecting the paint supply source to the painting robot through the sending-out device, and disposed so that a part thereof is located in a non-explosion-proof area, and a noncontact flowmeter disposed in the channel and configured to detect a flow rate of paint flowing through the channel. The paint supply source, the sending-out device, and the painting robot are disposed in an explosion-proof area and the noncontact flowmeter is disposed in the non-explosion-proof area.

According to this, it is not necessary to make the noncontact flowmeter explosion proof, thereby suppressing a cost increase in the system. Moreover, since the noncontact flowmeter is disposed in the non-explosion-proof area, the maintenance can easily be performed.

The above purpose, other purposes, features, and advantages of the present disclosure will be made clear from the following detailed description of suitable embodiments with reference to the accompanying drawings.

Effect of the Disclosure

According to the robot system of the present disclosure, the cost of the system can be reduced and the maintenance can be easier.

MODES FOR CARRYING OUT THE DISCLOSURE

Figure 1:
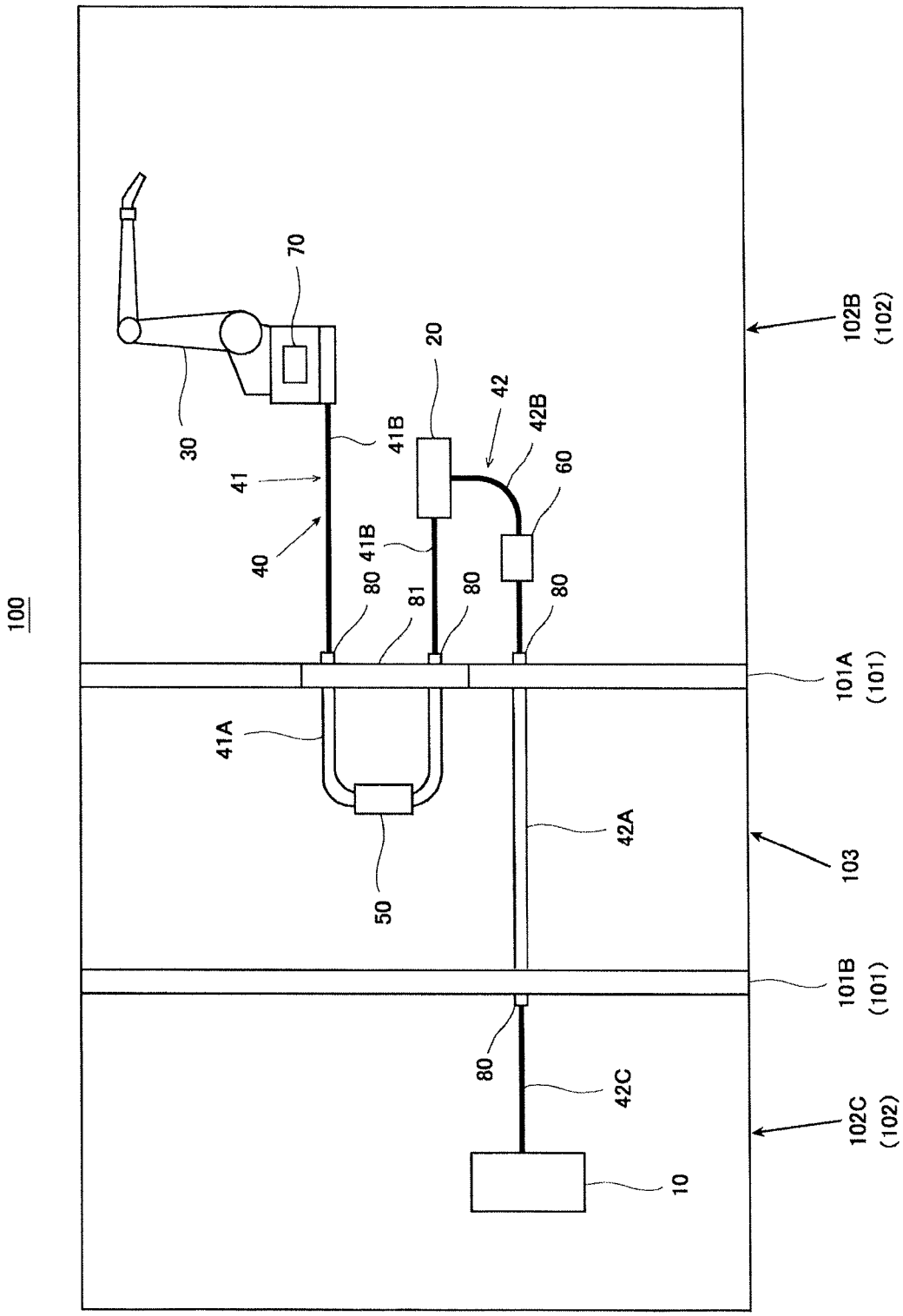
FIG. 1 is a schematic view illustrating an outline configuration of a robot system according to Embodiment 1.

Hereinafter, desirable embodiments of the present disclosure will be described with reference to the drawings. Note that, below, the same reference characters are assigned to the same or corresponding elements throughout the drawings to omit redundant description. Moreover, in all the drawings, components required for explaining the present disclosure are selectively illustrated, and illustration of other components may be omitted. Moreover, the present disclosure is not limited to the following embodiments.

Embodiment 1

A robot system according to Embodiment 1 includes a paint supply source, a sending-out device, a painting robot, a channel connecting the paint supply source to the painting robot through the sending-out device, and disposed so that a part thereof is located in a non-explosion-proof area, a noncontact flowmeter disposed in the channel and configured to detect a flow rate of paint which flows through the channel. The paint supply source, the sending-out device, and the painting robot are disposed in an explosion-proof area, and the noncontact flowmeter is disposed in the non-explosion-proof area.

Alternatively, in the robot system according to Embodiment 1, the channel may have a first channel which connects the sending-out device to the painting robot, and the noncontact flowmeter may be disposed in a first piping which constitutes the first channel and is disposed in the non-explosion-proof area.

Alternatively, in the robot system according to Embodiment 1, the piping disposed in the non-explosion-proof area may be made of metal.

Moreover, the robot system according to Embodiment 1 may further include a control device. The flow rate of the paint detected by the noncontact flowmeter may be inputted into the control device, and the control device may control operation of the sending-out device. The control device may determine whether an abnormality occurs in the channel based on the flow rate of the paint detected by the noncontact flowmeter, and the existence of the operation of the sending-out device.

Below, one example of the robot system according to Embodiment 1 is described in detail with reference to FIGS. 1 and 2.

[Configuration of Robot System]

FIG. 1 is a schematic view illustrating an outline configuration of the robot system according to Embodiment 1.

As illustrated in FIG. 1, a robot system 100 according to Embodiment 1 includes a paint supply source 10, a sending-out device 20, a painting robot 30, a channel 40, and a noncontact flowmeter 50. The paint supply source 10, the painting robot 30, and the sending-out device 20 are disposed in an explosion-proof area 102, and the noncontact flowmeter 50 is disposed in a non-explosion-proof area 103.

In more detail, the paint supply source 10 is disposed in a first explosion-proof area 102C, and the painting robot 30 and the sending-out device 20 are disposed in a second explosion-proof area 102B. Note that the paint supply source 10 may be disposed in the second explosion-proof area 102B. Here, when not distinguishing between the first explosion-proof area 102C and the second explosion-proof area 102B, these areas may be referred to as "the explosion-proof area 102."

The explosion-proof area 102 and the non-explosion-proof area 103 are isolated through a booth wall 101. In detail, the second explosion-proof area 102B and the non-explosion-proof area 103 are isolated through a booth wall 101A. The first explosion-proof area 102C and the non-explosion-proof area 103 are isolated through a booth wall 101B. Here, when not distinguishing between the booth wall 101A and the booth wall 101B, these walls may be referred to as "the booth wall 101."

The booth wall 101 is configured so that combustible matters (flammable gas) and/or burnable matters (burnable gas) which are volatilized in the explosion-proof area 102 may not flow into the non-explosion-proof area 103.

The paint is stored in the paint supply source 10, and the paint supply source 10 is connected with the painting robot 30 through the channel 40. The painting robot 30 may be any kind as long as it holds a paint gun. The painting robot 30 may be comprised of a vertical articulated robot or may be comprised of a horizontal articulated robot, for example.

At intermediate locations of the channel 40, a change-over device 60, the sending-out device 20, and the noncontact flowmeter 50 are disposed. The change-over device 60 is disposed between the paint supply source 10 and the sending-out device 20, and the noncontact flowmeter 50 is disposed between the sending-out device 20 and the painting robot 30.

Note that, a channel which connects between the sending-out device 20 and the painting robot 30 is referred to as "the first channel 41," and a channel which connects between the sending-out device 20 and the paint supply source 10 is referred to as "the second channel 42." Moreover, among pipings which constitute the first channel 41, a piping disposed in the non-explosion-proof area 103 is referred to as "the first piping 41A," and a piping disposed in the explosion-proof area 102 (the second explosion-proof area 102B) is referred to as "the piping 41B." Similarly, among pipings which constitute the second channel 42, a piping disposed in the non-explosion-proof area 103 is referred to as "the second piping 42A," and a piping disposed in the second non-explosion-proof area 102B is referred to as "the piping 42B," and a piping disposed in the first explosion-proof area 102C is referred to as "the piping 42C."

The first piping 41A disposed in the non-explosion-proof area 103 and the piping 41B disposed in the explosion-proof area 102, and the second piping 42A disposed in the non-explosion-proof area 103 and the pipings 42B and 42C disposed in the explosion-proof area 102 are each connected through a connector 80. Moreover, the first piping 41A and the second piping 42A may be each comprised of one piping, and may be each made of metal piping (steel piping). Alternatively, the first piping 41A and the second piping 42A may be each comprised of nonmetal material (e.g., plastic such as vinyl chloride, fiber-reinforced plastic).

Note that the first piping 41A may be installed in the non-explosion-proof area 103 as follows. The first piping 41A and the connectors 80 are installed in a plate-shaped partition member 81, and the partition member 81 is attached to an opening of the booth wall 101 with suitable members (bolts and nuts, etc.). Then, by fixing the piping 41B disposed in the explosion-proof area 102 (the second explosion-proof area 102B) to the connector 80, the first piping 41A is connected to the piping 41B.

The change-over device 60 may be a two-way valve (on-off valve), or may be an on-off valve configured so that a valve body is opened and closed according to air pressure, for example. The sending-out device 20 may be comprised of a gear pump, for example. Alternatively, the sending-out device 20 may be comprised of a plunger pump and a gear pump. In this case, the plunger pump may be disposed in the first explosion-proof area 102C, and the gear pump may be disposed in the second explosion-proof area 102B.

Note that the change-over device 60 and the sending-out device 20 are controlled by a control device 70 (described later). Moreover, the change-over device 60 and the sending-out device 20 are disposed in the explosion-proof area 102 (here, the second explosion-proof area 102B).

The sending-out device 20 is disposed in the explosion-proof area 102 in order to send out paint and/or organic solvent which are the combustible matter and/or the burnable matter, since they may volatilize and flow out from the sending-out device 20.

Note that, as for the sending-out device 20, a power source (e.g., a motor) of a pump may be disposed in the non-explosion-proof area 103 or may be disposed in the explosion-proof area 102. Moreover, as for the sending-out device 20, a pump mechanism (e.g., a reciprocating mechanism or a rotary mechanism such as a plunger, gears, etc.) may be disposed in the explosion-proof area 102.

The noncontact flowmeter 50 may be comprised of an ultrasonic flowmeter, or may be comprised of a magnetic flowmeter, for example. Moreover, the noncontact flowmeter 50 detects a flow rate of fluid (paint and/or organic solvent) which flows through the channel 40 (in Embodiment 1, the first piping 41A), and outputs the detected flow rate to the control device 70. Moreover, the noncontact flowmeter 50 is disposed exterior of the first piping 41A disposed in the non-explosion-proof area 103 so that it can detect the flow rate of the fluid, without contacting the fluid which flows through the first piping 41A.

Moreover, the painting robot 30 (robot system 100) has the control device 70. Note that the control device 70 may be disposed in the explosion-proof area 102, or may be disposed in the non-explosion-proof area 103.

The control device 70 includes a processor such as a microprocessor or a CPU, a memory such as a ROM and/or a RAM, and an input device (none of them is illustrated). By reading and executing software, such as a basic program stored in the memory, the processor controls various operations of each instrument which constitutes the robot system 100 of the painting robot 30, etc.

The memory readably stores the basic program and various data, and the memory is comprised of a known storage device, such as a memory or hard disk drive. The memory does not need to be a single device, and may be configured as a plurality of storage devices (e.g., a random-access memory and a hard disk drive). If the control device 70 etc. is comprised of a microcomputer, at least a part of the memory may be configured as an internal memory of the microcomputer, or may be configured as an independent memory.

Note that it is needless to say that the memory stores data, and devices other than the control device 70 are possible to read the data from the memory, or the control device 70 etc. is possible to write data.

The input device enables an input of data, such as various parameters related to the control of the robot system 100 or other parameters, into the control device 70 (processor), and is comprised of a known input device, such as a keyboard, a touch panel, or a button-switch group.

Note that the control device 70 may be comprised of a sole control device 70 which carries out a centralized control, or may be comprised of a plurality of control devices 70 which collaboratively carry out a distributed control. Moreover, the control device 70 may be comprised of a microcomputer, and may be comprised of an MPU, a PLC (Programmable Logic Controller), or a logic circuit.

[Operation and Effects of Robot System]

Next, operation and effects of the robot system 100 according to Embodiment 1 are described with reference to FIGS. 1 and 2.

Figure 2:
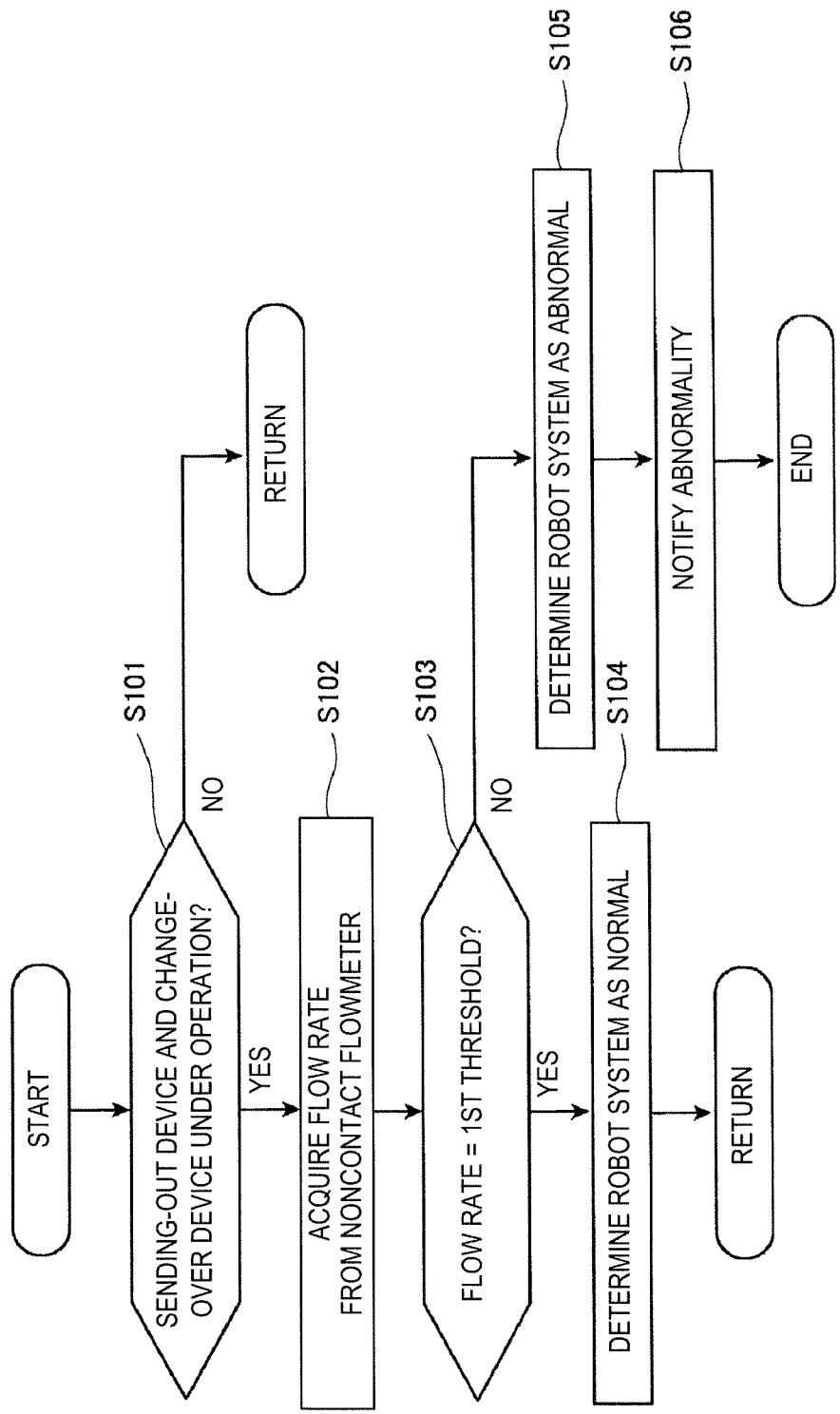
FIG. 2 is a flowchart illustrating one example of operation of the robot system according to Embodiment 1.

FIG. 2 is a flowchart illustrating one example of operation of the robot system according to Embodiment 1. Note that the following operation is performed by the processor of the control device 70 reading a given program stored in the memory.

As illustrated in FIG. 2, the control device 70 determines whether the sending-out device 20 and the change-over device 60 are under operation (Step S101). Note that "under operation of the change-over device 60" refers to a state where the valve body is opened and the paint is allowed to flow through the channel 40.

If the control device 70 determines that the sending-out device 20 and the change-over device 60 are not under operation (No at Step S101), it can be considered that the sending-out device 20 and the change-over device 60 have been suspended. In this case, since the noncontact flowmeter 50 does not detect the flow rate of the paint, the control device 70 performs processing at Step S101 again, for example, after 50 msec.

Note that, if the noncontact flowmeter 50 detects the flow rate of the paint when the control device 70 determines that the sending-out device 20 and the change-over device 60 are not under operation (No at Step S101), it may determine that the sending-out device 20 and/or the noncontact flowmeter 50 is abnormal (failed).

On the other hand, if the control device 70 determines that the sending-out device 20 and the change-over device 60 are under operation (Yes at Step S101), it acquires, from the noncontact flowmeter 50, the flow rate of the paint detected by the noncontact flowmeter 50 (Step S102).

Next, the control device 70 determines whether the flow rate acquired at Step S102 is equal to a first threshold (Step S103). Here, the first threshold may be a flow rate of the paint sent out from the sending-out device 20 (or a discharge amount of the paint discharged from the paint gun), which is inputted by a worker into an arithmetic logical unit through the input device. Moreover, the first threshold may be a value of the flow rate of the paint taking a pressure loss of the channel, the accuracy of the noncontact flowmeter 50, etc. into consideration, and, for example, it may be an arbitrary value between 95%-105% of the flow rate of the paint.

If the control device 70 determines that the flow rate acquired at Step S102 is equal to the first threshold (Yes at Step S103), it determines that the robot system 100 is normal (Step S104), and then it performs processing at Step S101 again, for example, after 50 msec.

On the other hand, if the control device 70 determines that the flow rate acquired at Step S102 is not equal to the first threshold (No at Step S103), it determines that the robot system 100 is abnormal (Step S105), causes an annunciator (not illustrated) to notify the abnormality of the robot system 100 (Step S106), and ends this program.

Note that the abnormality of the robot system 100 includes a failure of at least one instrument of the sending-out device 20, the noncontact flowmeter 50, and the change-over device 60, and/or a leakage of the paint from the channel 40.

For example, if the flow rate acquired at Step S102 is above the first threshold, the control device 70 may determine that the sending-out device 20 and/or the noncontact flowmeter 50 is failed. Moreover, for example, if the flow rate acquired at Step S102 is below the first threshold, the control device 70 may determine that an abnormality occurs, such as a leakage of the paint from the change-over device 60 and/or the channel 40, or clogging.

Moreover, a method of informing or notifying by the annunciator may be displaying character data or image data on a display device (screen), informing by audio with a speaker or a siren, or informing by light or color with a lamp. Moreover, it may be informing to a smartphone, a cellular phone, or a tablet computer by an email or an application through a communication network.

In the robot system 100 according to Embodiment 1 configured in this way, the noncontact flowmeter 50 is disposed in the non-explosion-proof area 103. That is, since there is no possibility that the paint and/or the organic solvent flows out from the flowmeter by selecting the noncontact flowmeter as the flowmeter, it can be disposed in the non-explosion-proof area 103.

Moreover, by selecting the noncontact flowmeter as the flowmeter, it is not necessary to make it explosion proof, thereby suppressing a cost increase in the robot system 100.

Moreover, since the noncontact flowmeter 50 is disposed in the non-explosion-proof area 103, the maintenance can easily be performed.

Moreover, in the robot system 100 according to Embodiment 1, by attaching to the opening formed in the booth wall 101 the partition member 81 in which the first piping 41A and the connectors 80 are installed, the first piping 41A can be easily installed in the non-explosion-proof area 103. Therefore, the noncontact flowmeter 50 can be easily installed in a facility, such as an existing paint application line.

[Modification 1]

Next, a modification of the robot system according to Embodiment 1 is described with reference to FIGS. 3, 4A, and 4B.

[Configuration of Robot System]

Figure 3:
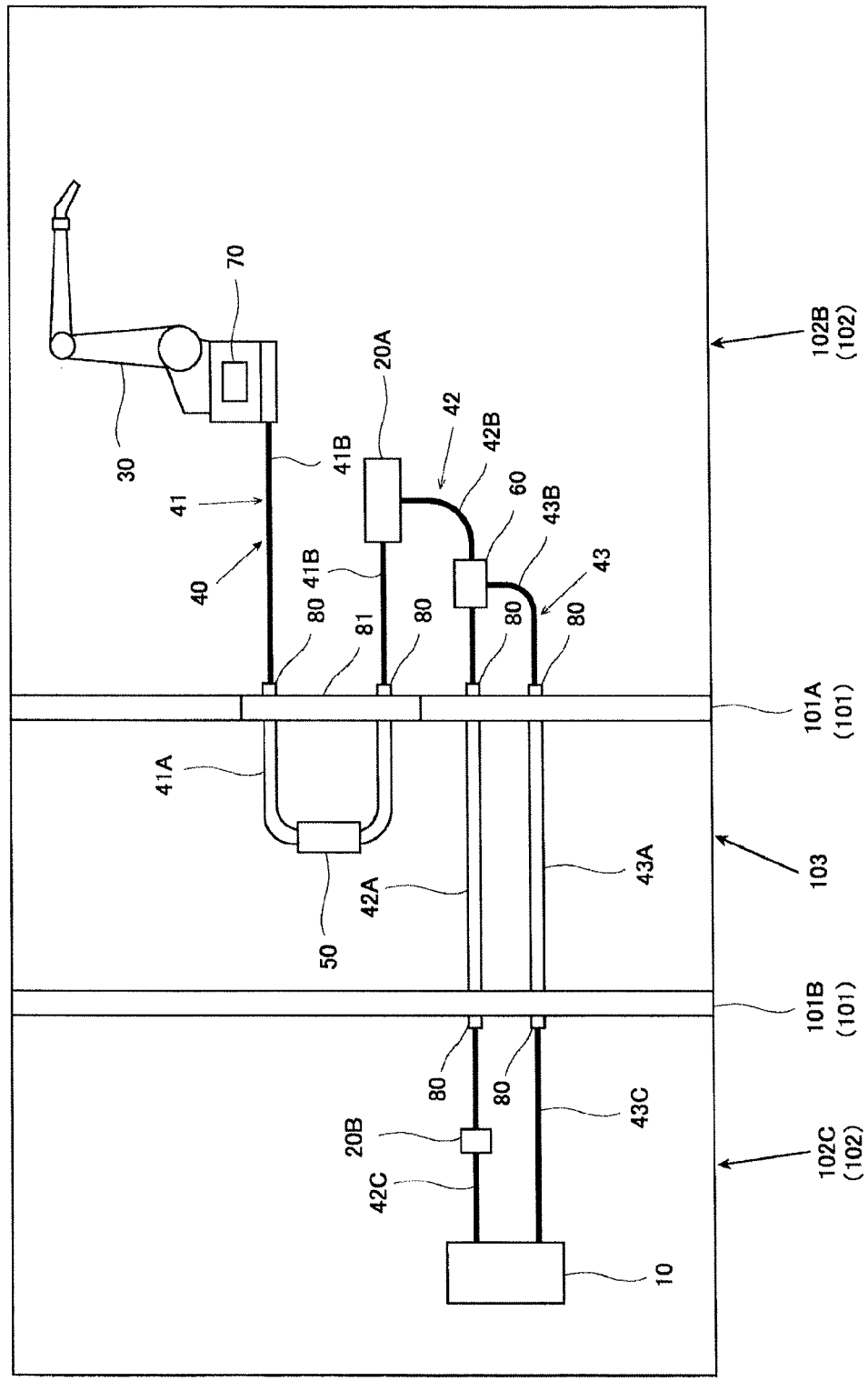
FIG. 3 is a schematic view illustrating an outline configuration of a robot system of Modification 1 of Embodiment 1.

FIG. 3 is a schematic view illustrating an outline configuration of a robot system of Modification 1 of Embodiment 1.

As illustrated in FIG. 3, the robot system 100 of Modification 1 is the same in the fundamental configuration of the robot system 100 according to Embodiment 1, but it differs in that a third channel 43 which connects the change-over device 60 to the paint supply source 10 is provided, and two sending-out devices (a first sending-out device 20A and a second sending-out device 20B) are provided.

Note that, among pipings which constitute the third channel 43, a piping disposed in the non-explosion-proof area 103 is referred to as "the third piping 43A," a piping disposed in the second explosion-proof area 102B is referred to as "the piping 43B," and a piping disposed in the first explosion-proof area 102C is referred to as "the piping 43C."

Moreover, in Modification 1, the change-over device 60 may be comprised of a three-way valve, or may be comprised of a two-way valves disposed in each of the piping 42B and the piping 43B.

Note that, if the change-over device 60 is comprised of the three-way valve, the three-way valve may be configured so that the paint which flows through the second piping 42A flows only to the first channel 41 side or only to the third channel 43 side. Alternatively, the three-way valve may be configured so that the paint which flows through the second piping 42A flows to both the first channel 41 and the third channel 43 at a given ratio. Here, the given ratio may be a ratio of 75 to 95% to the first channel 41 side and a ratio of 5 to 25% to the third channel 43 side.

The first sending-out device 20A may be configured to send out the paint to the paint gun of the painting robot 30, for example, it may be comprised of a gear pump. Moreover, the second sending-out device 20B may be configured to circulate the paint, and it may be comprised of a plunger pump.

In detail, the first sending-out device 20A is disposed in a part of the piping 42B downstream of the change-over device 60. The second sending-out device 20B is disposed in the piping 42C. Note that the second sending-out device 20B may be disposed in the piping 43C.

[Operation and Effects of Robot System]

Next, operation and effects of the robot system 100 of Modification 1 are described with reference to FIGS. 3, 4A, and 4B.

Figure 4A:
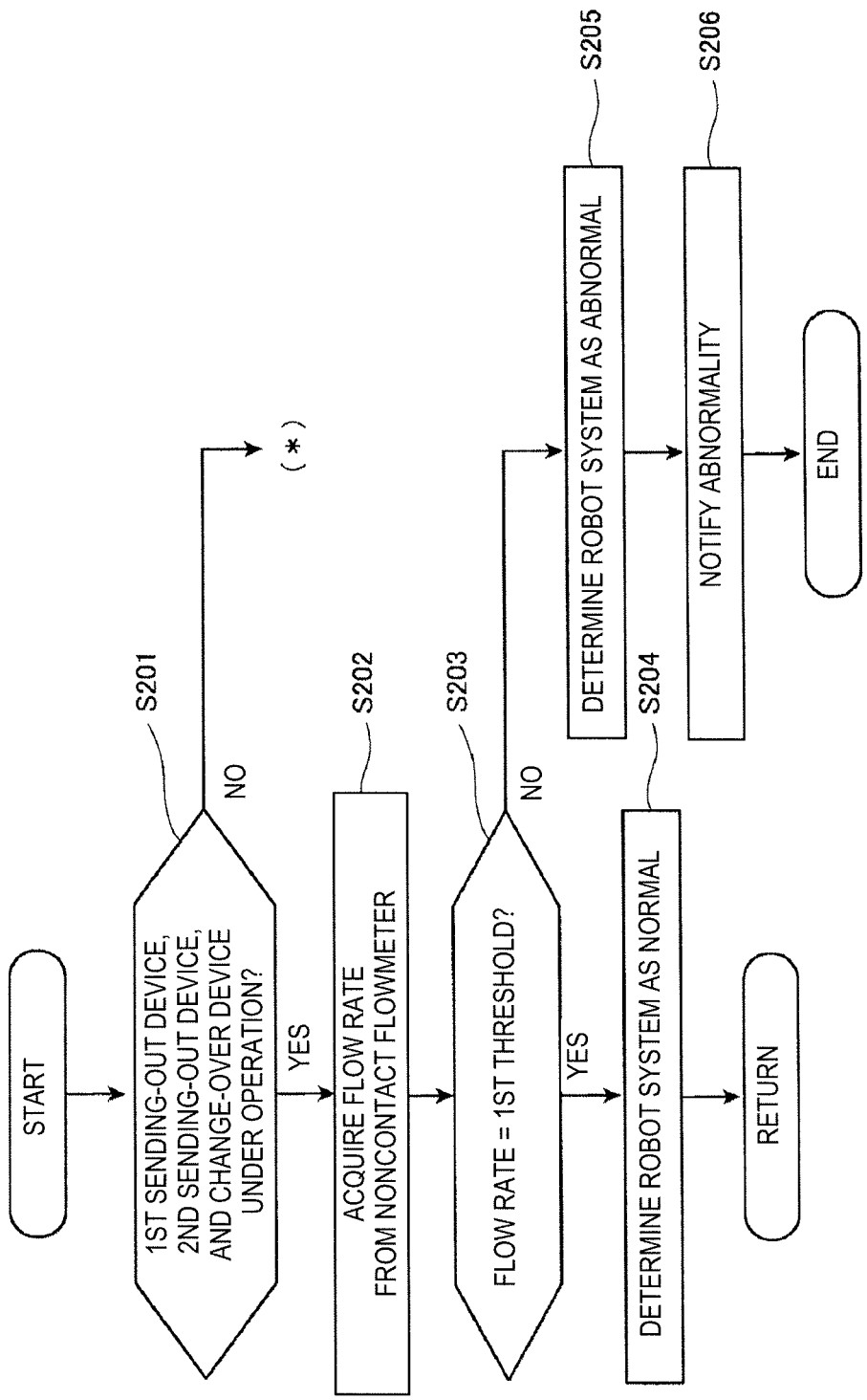
FIG. 4A is a flowchart illustrating one example of operation of the robot system of Modification 1 of Embodiment 1.
Figure 4B:
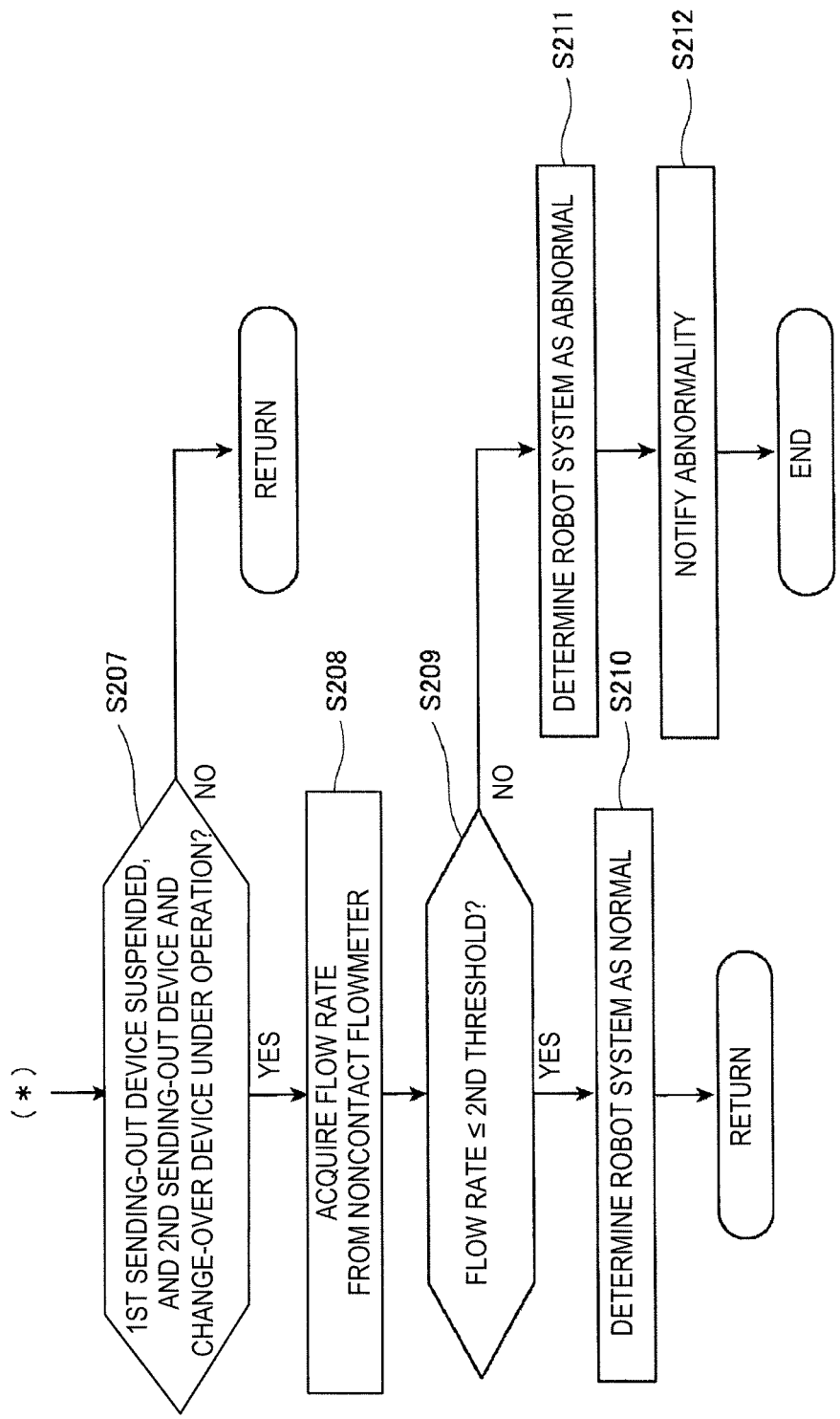
FIG. 4B is a flowchart illustrating one example of the operation of the robot system of Modification 1 of Embodiment 1.

FIGS. 4A and 4B are flowcharts illustrating one example of operation of the robot system of Modification 1 of Embodiment 1. Note that the following operation is performed by the processor of the control device 70 reading a given program stored in the memory.

As illustrated in FIGS. 4A and 4B, the control device 70 determines whether the first sending-out device 20A, the second sending-out device 20B, and the change-over device 60 are under operation (Step S201). Note that, at Step S201, "under operation of the change-over device 60" refers to the change-over device 60 operating so that the paint flows from the second channel 42 to the first channel 41. For example, if the change-over device 60 is comprised of the three-way valve, it refers to a state of connecting ports so that the paint flows through the piping 42B.

If the control device 70 determines that the first sending-out device 20A, the second sending-out device 20B, and the change-over device 60 are not under operation (No at Step S201), it performs processing at Step S207. Note that the processing at Step S207 will be described later.

On the other hand, if the control device 70 determines that the first sending-out device 20A, the second sending-out device 20B, and the change-over device 60 are under operation (Yes at Step S201), it acquires, from the noncontact flowmeter 50, the flow rate of the paint detected by the noncontact flowmeter 50 (Step S202).

Next, the control device 70 determines whether the flow rate acquired at Step S202 is equal to the first threshold (Step S203). Here, the first threshold may be a flow rate of the paint sent out from the first sending-out device 20A (or a discharge amount of the paint discharged from the paint gun), which is inputted by the worker into the arithmetic logical unit through the input device. Moreover, the first threshold may be a value of the flow rate of the paint taking the pressure loss of the channel, the accuracy of the noncontact flowmeter 50, etc. into consideration, and, for example, it may be an arbitrary value between 95%-105% of the flow rate of the paint.

If the control device 70 determines that the flow rate acquired at Step S202 is equal to the first threshold (Yes at Step S203), it determines that the robot system 100 is normal (Step S204), and it performs the processing at Step S201 again, for example, after 50 msec.

On the other hand, if the control device 70 determines that the flow rate acquired at Step S202 is not equal to the first threshold (No at Step S203), it determines that the robot system 100 is abnormal (Step S205), causes the annunciator (not illustrated) to notify the abnormality of the robot system 100 (Step S206), and ends this program.

Moreover, if the control device 70 determines that the first sending-out device 20A, the second sending-out device 20B, and the change-over device 60 are not under operation (No at Step S201), it determines whether the first sending-out device 20A is suspended, and the second sending-out device 20B and the change-over device 60 are under operation (Step S207; see FIG. 4B).

Note that, at Step S207, "under operation of the change-over device 60" refers to the change-over device 60 operating so that the paint flows from the second channel 42 to the third channel 43. For example, if the change-over device 60 is comprised of the three-way valve, it refers to a state of connecting ports so that the paint flows from the piping 42B to the piping 43B.

If the control device 70 determines that the first sending-out device 20A is suspended, and the second sending-out device 20B and the change-over device 60 are not under operation (No at Step S207), it can be considered that the first sending-out device 20A, the second sending-out device 20B, and the change-over device 60 are suspended. In this case, since it can be considered that the noncontact flowmeter 50 does not detect the flow rate of the paint, the control device 70 performs processing at Step S201 again, for example, after 50 msec.

Note that, if the control device 70 determines that the first sending-out device 20A is suspended, and the second sending-out device 20B and the change-over device 60 are not under operation (No at Step S207), and if the noncontact flowmeter 50 detects the flow rate of the paint, the control device 70 may determine that at least one or more instrument of the first sending-out device 20A, the second sending-out device 20B, and the noncontact flowmeter 50 is abnormal (failed).

On the other hand, if the control device 70 determines that the first sending-out device 20A is suspended, and the second sending-out device 20B and the change-over device 60 are under operation (Yes at Step S207), it acquires, from the noncontact flowmeter 50, the flow rate of the paint detected by the noncontact flowmeter 50 (Step S208).

Next, the control device 70 determines whether the flow rate acquired at Step S208 is at or below a second threshold (Step S209).

Meanwhile, if the first sending-out device 20A is suspended, and the second sending-out device 20B and the change-over device 60 are under operation, the paint flows to the change-over device 60 from the paint supply source 10 through the second piping 42A and the piping 42B, and then returns to the paint supply source 10 through the piping 43B and the third piping 43A. That is, it circulates through the channel between the paint supply source 10 and the change-over device 60. Therefore, if the robot system 100 is normal, the noncontact flowmeter 50 does not detect the flow rate. Therefore, the second threshold may be 0.

If the control device 70 determines that the flow rate acquired at Step S208 is at or below the second threshold (Yes at Step S209), it determines that the robot system 100 is normal (Step S210), and it performs the processing at Step S201 again, for example, after 50 msec.

On the other hand, if the control device 70 determines that the flow rate acquired at Step S208 is above the second threshold (No at Step S209), it determines that the robot system 100 is abnormal (an abnormality occurs in the robot system 100) (Step S211), causes the annunciator (not illustrated) to notify the abnormality of the robot system 100 (Step S212), and ends this program.

The robot system 100 of Modification 1 configured in this way also has similar operation and effects to the robot system 100 according to Embodiment 1.

Embodiment 2

A robot system according to Embodiment 2 may be configured such that the channel has a second channel which connects the paint supply source to the sending-out device, and the noncontact flowmeter is disposed in a second piping which constitutes the second channel and is disposed in the non-explosion-proof area, in the robot system according to Embodiment 1.

Alternatively, the robot system according to Embodiment 2 may further be provided with a control device. A flow rate of the paint detected by the noncontact flowmeter may be inputted into the control device, and the control device may control operation of the sending-out device. The control device may determine whether an abnormality occurs in the channel based on the flow rate of the paint detected by the noncontact flowmeter, and the existence of the operation of the sending-out device.

Below, one example of the robot system according to Embodiment 2 is described in detail with reference to FIG. 5. Note that, since operation of the robot system according to Embodiment 2 is performed similarly to the robot system 100 according to Embodiment 1, the detailed description is omitted.

[Configuration of Robot System]

Figure 5:
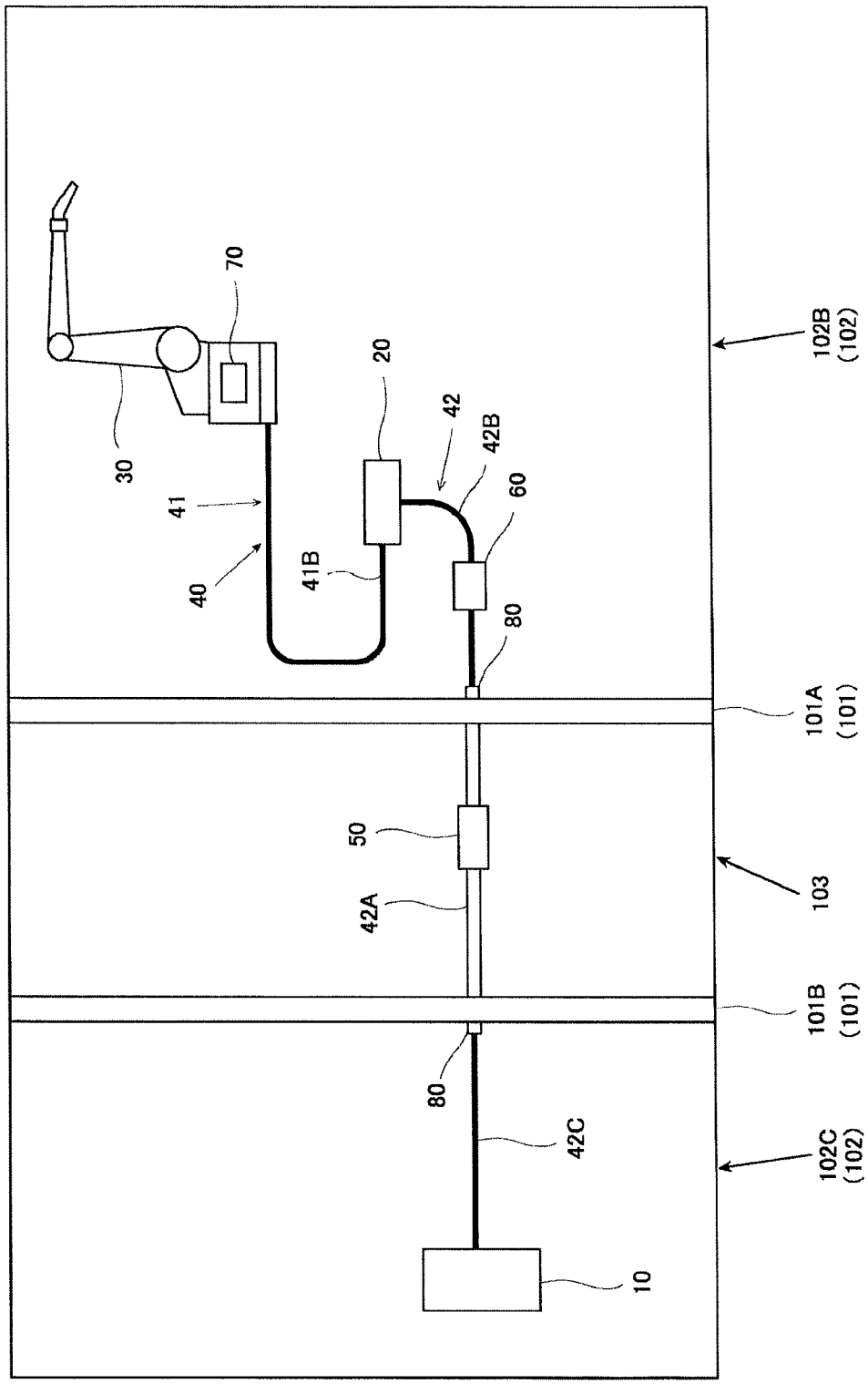
FIG. 5 is a schematic view illustrating an outline configuration of a robot system according to Embodiment 2.

FIG. 5 is a schematic view illustrating an outline configuration of the robot system according to Embodiment 2.

As illustrated in FIG. 5, the robot system 100 according to Embodiment 2 is the same in the fundamental configuration according to Embodiment 1 of the robot system 100, but differs in that the first piping 41A is not disposed in the first channel 41, and the noncontact flowmeter 50 is disposed in the second piping 42A.

The robot system 100 according to Embodiment 2 configured in this way also has similar operation and effects to the robot system 100 according to Embodiment 1.

[Modification 1]

Next, a modification of the robot system according to Embodiment 2 is described with reference to FIG. 6. Note that, since operation of the robot system of Modification 1 of Embodiment 2 is performed similarly to the robot system 100 of Modification 1 of Embodiment 1, the detailed description is omitted.

[Configuration of Robot System]

Figure 6:
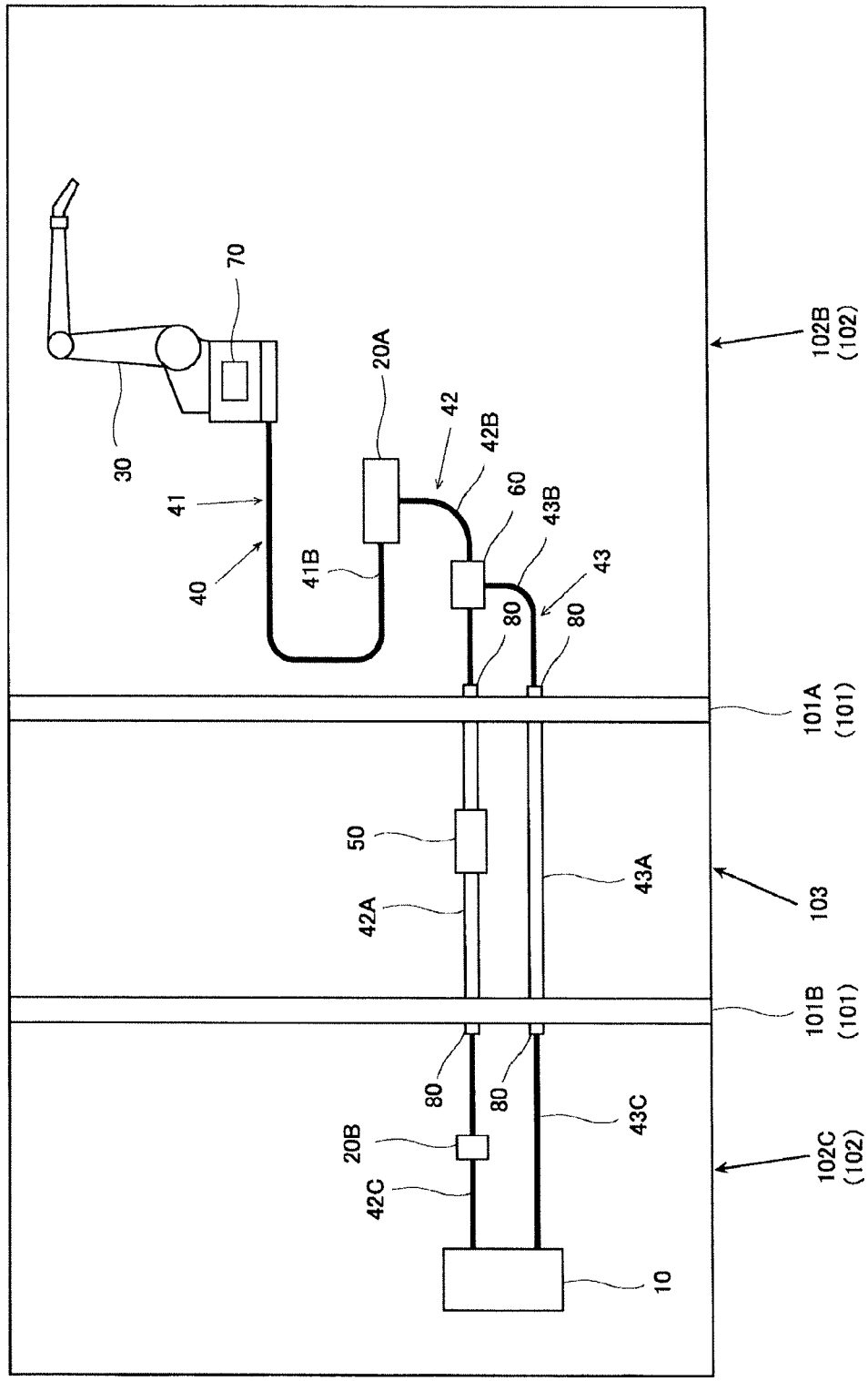
FIG. 6 is a schematic view illustrating an outline configuration of a robot system of Modification 1 of Embodiment 2.

FIG. 6 is a schematic view illustrating an outline configuration of the robot system of Modification 1 of Embodiment 2.

As illustrated in FIG. 6, the robot system 100 of Modification 1 is the same in the fundamental configuration as the robot system 100 according to Embodiment 2, but it differs in that the third channel 43 which connects the change-over device 60 to the paint supply source 10 is provided, and two sending-out devices (the first sending-out device 20A and the second sending-out device 20B) are provided.

Note that, among the pipings which constitute the third channel 43, the piping disposed in the non-explosion-proof area 103 is referred to as "the third piping 43A," the piping disposed in the second explosion-proof area 102B is referred to as "the piping 43B," and the piping disposed in the first explosion-proof area 102C is referred to as "the piping 43C."

Moreover, in Modification 1, the change-over device 60 may be comprised of a three-way valve, or may be comprised of a two-way valve disposed in each of the piping 42B and the piping 43B.

Note that, if the change-over device 60 is comprised of the three-way valve, the three-way valve may be configured so that the paint which flows through the second piping 42A flows only to the first channel 41 side or only to the third channel 43 side. Moreover, the three-way valve may be configured so that the paint which flows through the second piping 42A flows through both the first channel 41 and the third channel 43 at a given ratio. Here, the given ratio may be a ratio of 75 to 95% to the first channel 41 side and a ratio of 5 to 25% to the third channel 43 side.

The first sending-out device 20A may be configured to send out the paint to the paint gun of the painting robot 30, and, for example, it may be comprised of a gear pump. Moreover, the second sending-out device 20B may be configured to circulate the paint, and it may be comprised of a plunger pump.

In detail, the first sending-out device 20A is disposed in a part of the piping 42B downstream of the change-over device 60. The second sending-out device 20B is disposed in the piping 42C. Note that the second sending-out device 20B may be disposed in the piping 43C.

The robot system 100 of Modification 1 configured in this way also has similar operation and effects to the robot system 100 according to Embodiment 1.

Embodiment 3

A robot system according to Embodiment 3 may be configured such that the channel has a second channel which connects the paint supply source to the sending-out device, and the noncontact flowmeter is disposed in a second piping which constitutes the second channel and is disposed in the non-explosion-proof area, in the robot system according to Embodiment 1 or Embodiment 2.

Alternatively, in the robot system according to Embodiment 3, the channel may have a second channel which connects the paint supply source to the sending-out device, and a third channel. At an intermediate location of the second channel, the change-over device may be disposed. The third channel may connect the change-over device to the paint supply source, and the noncontact flowmeter may be disposed in a third piping which constitutes the third channel and is disposed in the non-explosion-proof area.

Alternatively, in the robot system according to Embodiment 3, the channel may have a first channel which connects the sending-out device to the painting robot, a second channel which connects the paint supply source to the sending-out device, and a third channel. At an intermediate location of the second channel, the change-over device may be disposed, and the third channel may connect the change-over device to the paint supply source. The noncontact flowmeter may be disposed in at least two of a first piping which constitutes the first channel and is disposed in the non-explosion-proof area, a second piping which constitutes the second channel and is disposed in the non-explosion-proof area, and a third piping which constitutes the third channel and is disposed in the non-explosion-proof area.

Alternatively, in the robot system according to Embodiment 3, the channel may have a first channel which connects the sending-out device to the painting robot, a second channel which connects the paint supply source to the sending-out device, and a third channel. At an intermediate location of the second channel, the change-over device may be disposed, and the third channel may connect the change-over device to the paint supply source. The noncontact flowmeter may be disposed in each of a second piping which constitutes the second channel and is disposed in the non-explosion-proof area, and a third piping which constitutes the third channel and is disposed in the non-explosion-proof area.

Alternatively, the robot system according to Embodiment 3 may further be provided with a control device. A flow rate of the paint detected by the noncontact flowmeter may be inputted into the control device, and the control device may control operation of the sending-out device. The control device may determine whether an abnormality occurs in the channel based on the flow rate of the paint detected by the noncontact flowmeter, and the existence of the operation of the sending-out device.

Below, one example of the robot system according to Embodiment 3 is described in detail with reference to FIGS. 7 to 9C.

[Configuration of Robot System]

Figure 7:
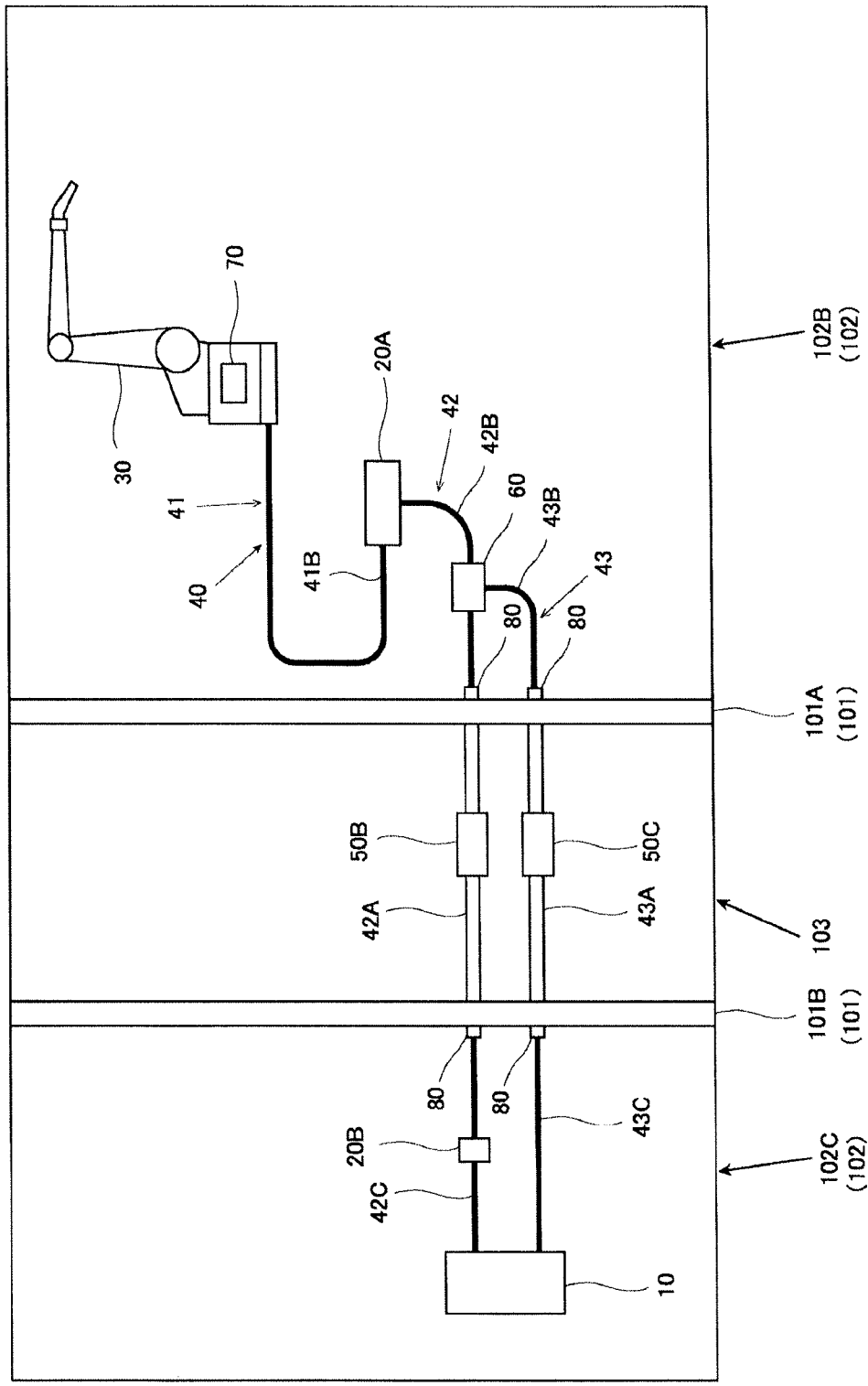
FIG. 7 is a schematic view illustrating an outline configuration of a robot system according to Embodiment 3.

FIG. 7 is a schematic view illustrating an outline configuration of the robot system according to Embodiment 3.

As illustrated in FIG. 7, the robot system 100 according to Embodiment 3 is the same in the fundamental configuration according to Embodiment 1 of the robot system 100, but differs in that the third channel 43 which connects the change-over device 60 to the paint supply source 10 is provided, two sending-out devices (a first sending-out device 20A and a second sending-out device 20B) are provided, and two noncontact flowmeters 50 (a second noncontact flowmeter 50B and a third noncontact flowmeter 50C) are provided.

Note that, among the pipings which constitute the third channel 43, the piping disposed in the non-explosion-proof area 103 is referred to as "the third piping 43A," the piping disposed in the second explosion-proof area 102B is referred to as "the piping 43B," and the piping disposed in the first explosion-proof area 102C is referred to as "the piping 43C."

Moreover, in Embodiment 3, the change-over device 60 may be comprised of a three-way valve, or may be comprised of a two-way valve disposed in each of the piping 42B and the piping 43B.

The first sending-out device 20A may be configured to send out the paint to the paint gun of the painting robot 30, and, for example, it may be comprised of a gear pump. Moreover, the second sending-out device 20B may be configured to circulate the paint, and it may be comprised of a plunger pump.

In detail, the first sending-out device 20A is disposed in a part of the piping 42B downstream of the change-over device 60. The second sending-out device 20B is disposed in the piping 42C. Note that the second sending-out device 20B may be disposed in the piping 43C.

The second noncontact flowmeter 50B is disposed in the second piping 42A, and the third noncontact flowmeter 50C is disposed in the third piping 43A. The second noncontact flowmeter 50B and the third noncontact flowmeter 50C may be comprised of noncontact flowmeters of the same type (e.g., ultrasonic flowmeters), or may be comprised of noncontact flowmeters of different types (e.g., an ultrasonic flowmeter and a magnetic flowmeter).

[Operation and Effects of Robot System]

Next, operation and effects of the robot system 100 according to Embodiment 3 are described with reference to FIGS. 7 to 9C.

Figure 8A:
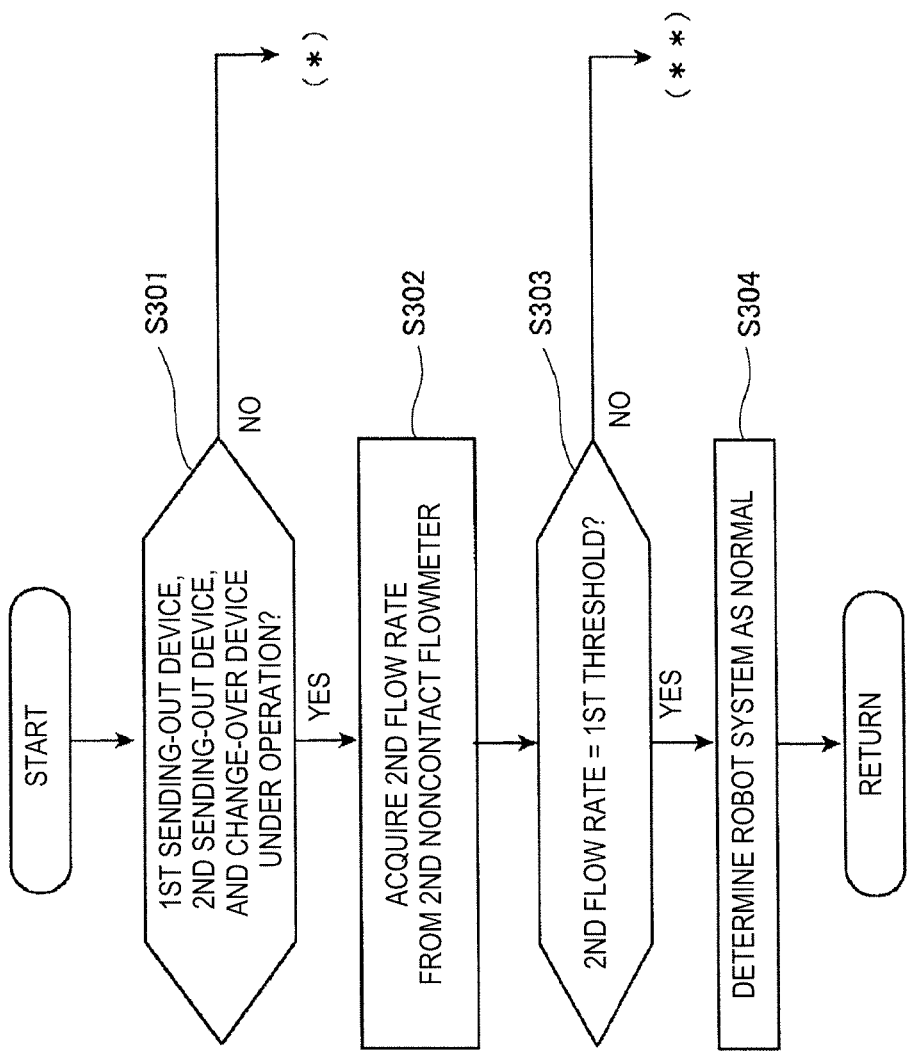
FIG. 8A is a flowchart illustrating one example of operation of the robot system according to Embodiment 3.
Figure 8B:
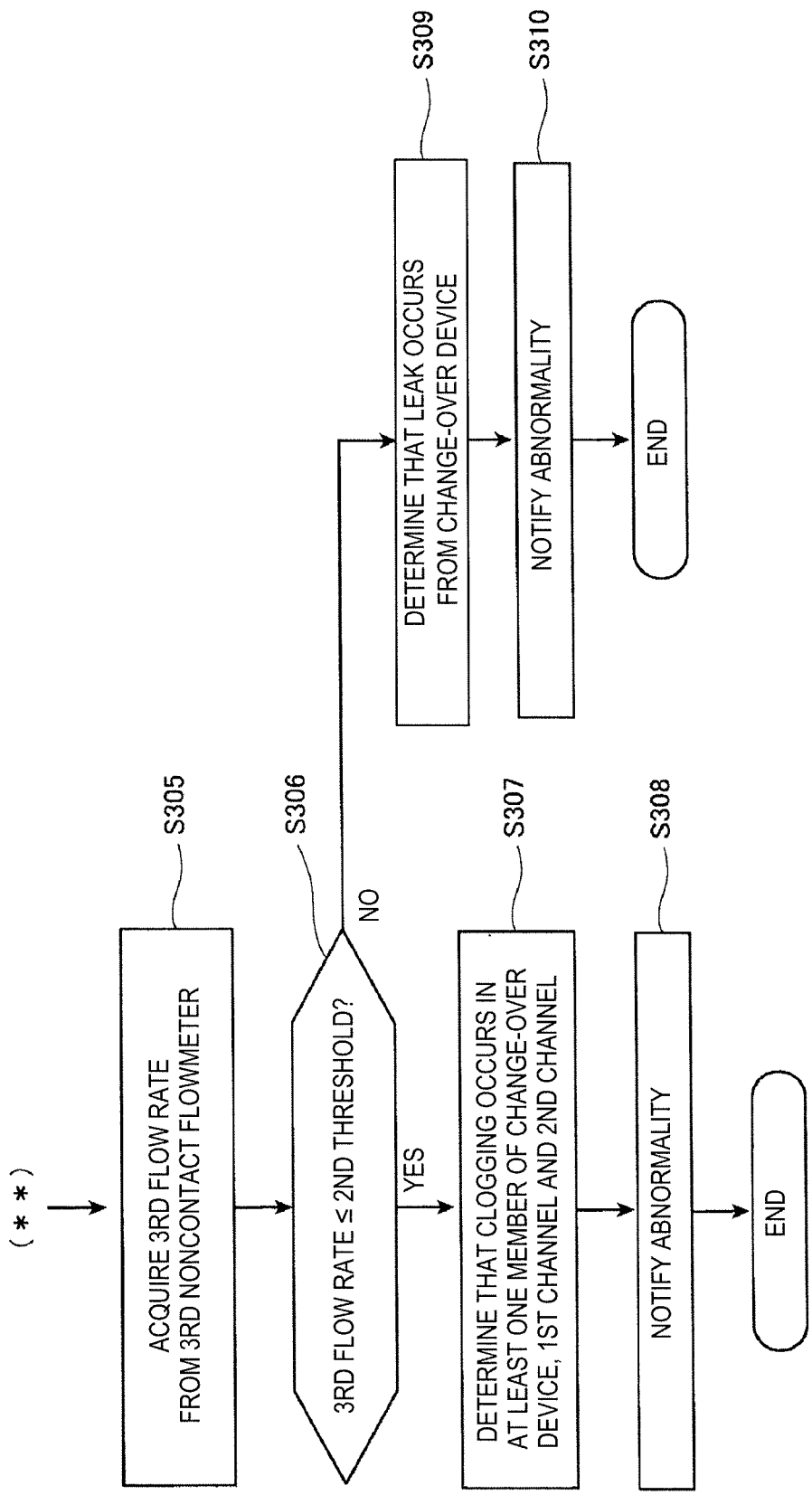
FIG. 8B is a flowchart illustrating one example of the operation of the robot system according to Embodiment 3.
Figure 8C:
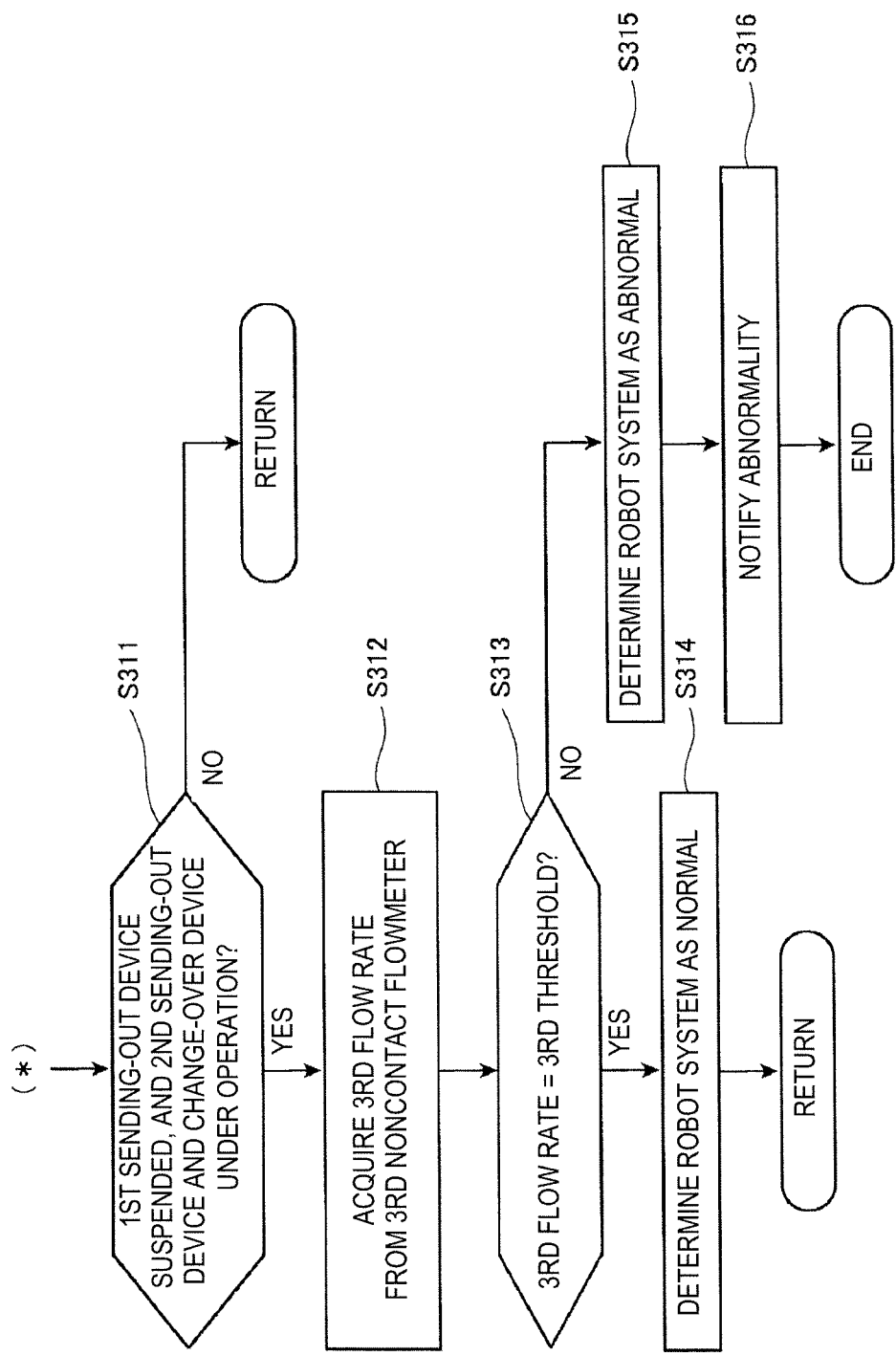
FIG. 8C is a flowchart illustrating one example of the operation of the robot system according to Embodiment 3.
Figure 9A:
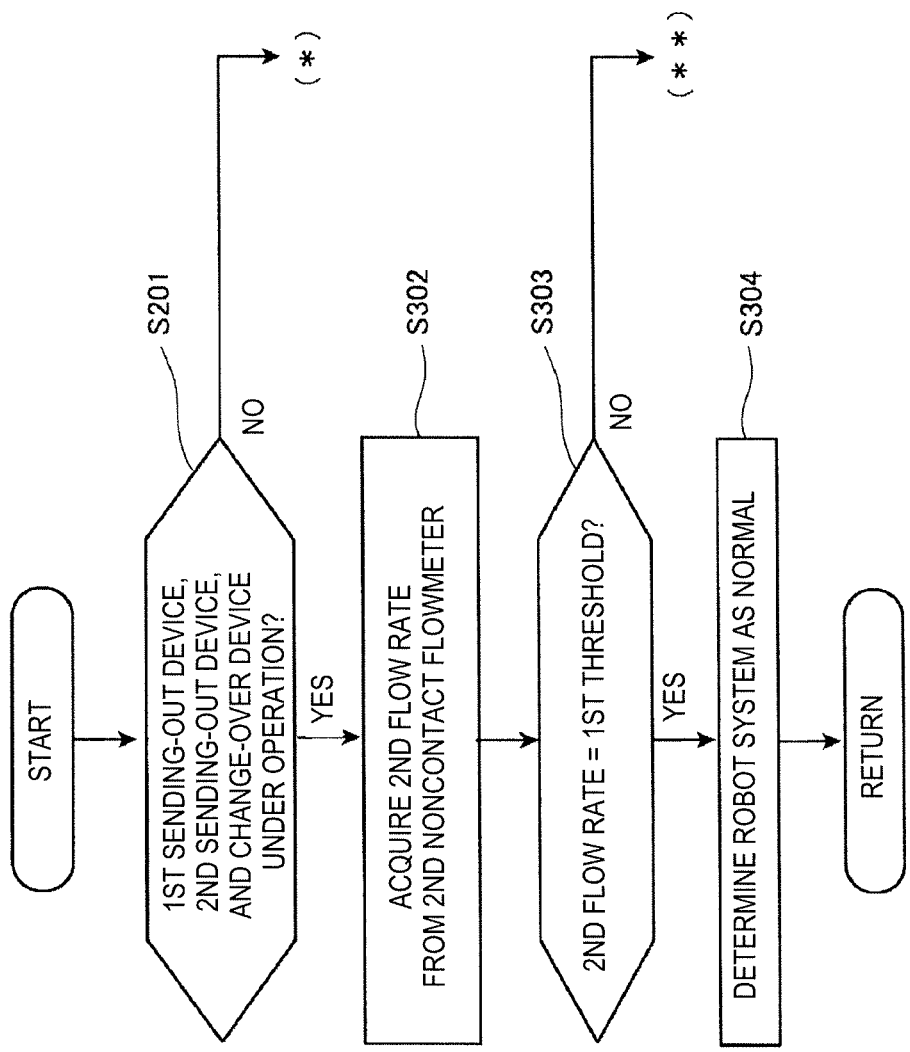
FIG. 9A is a flowchart illustrating another example of the operation of the robot system according to Embodiment 3.
Figure 9B:
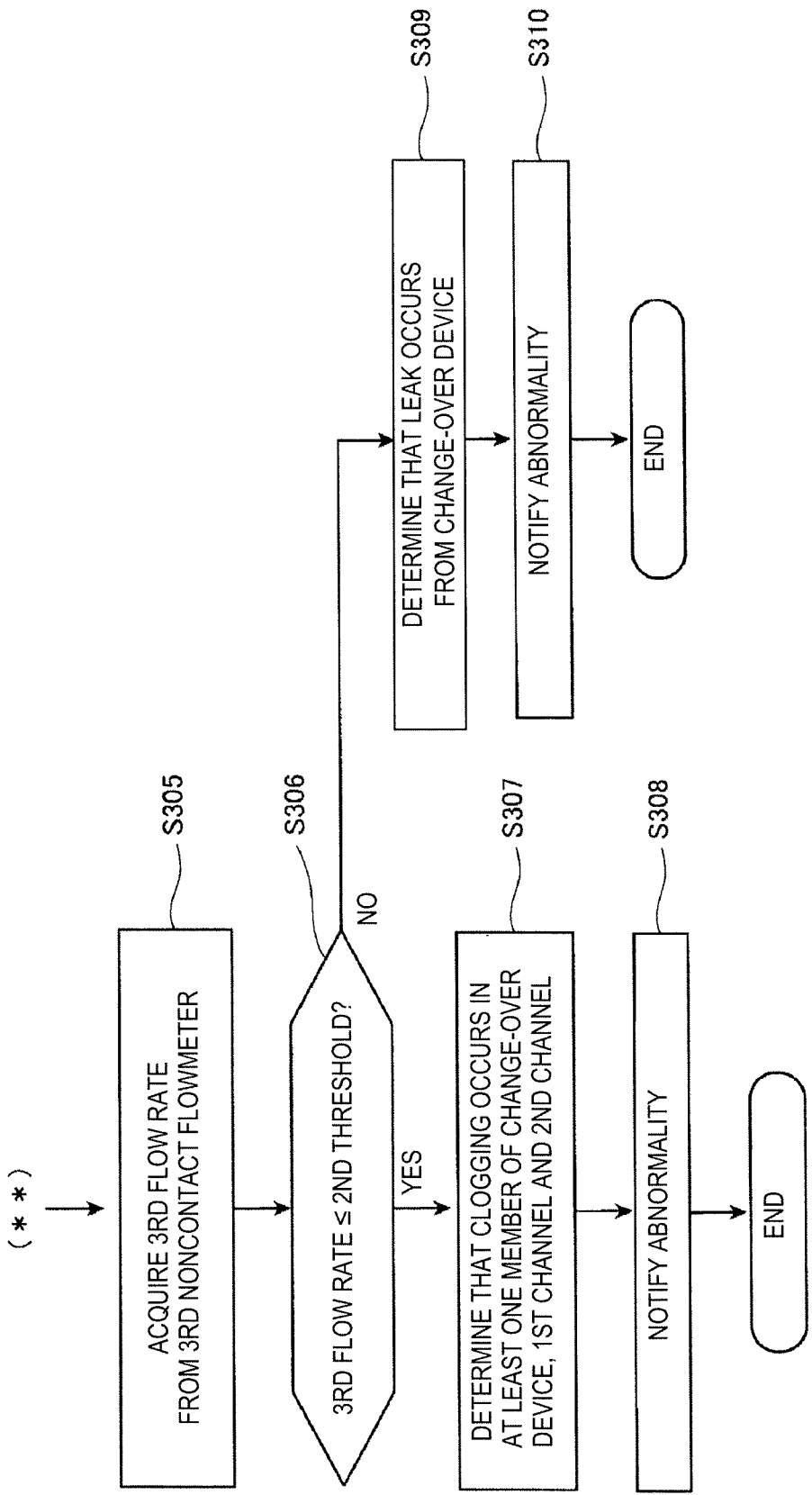
FIG. 9B is a flowchart illustrating another example of the operation of the robot system according to Embodiment 3.
Figure 9C:
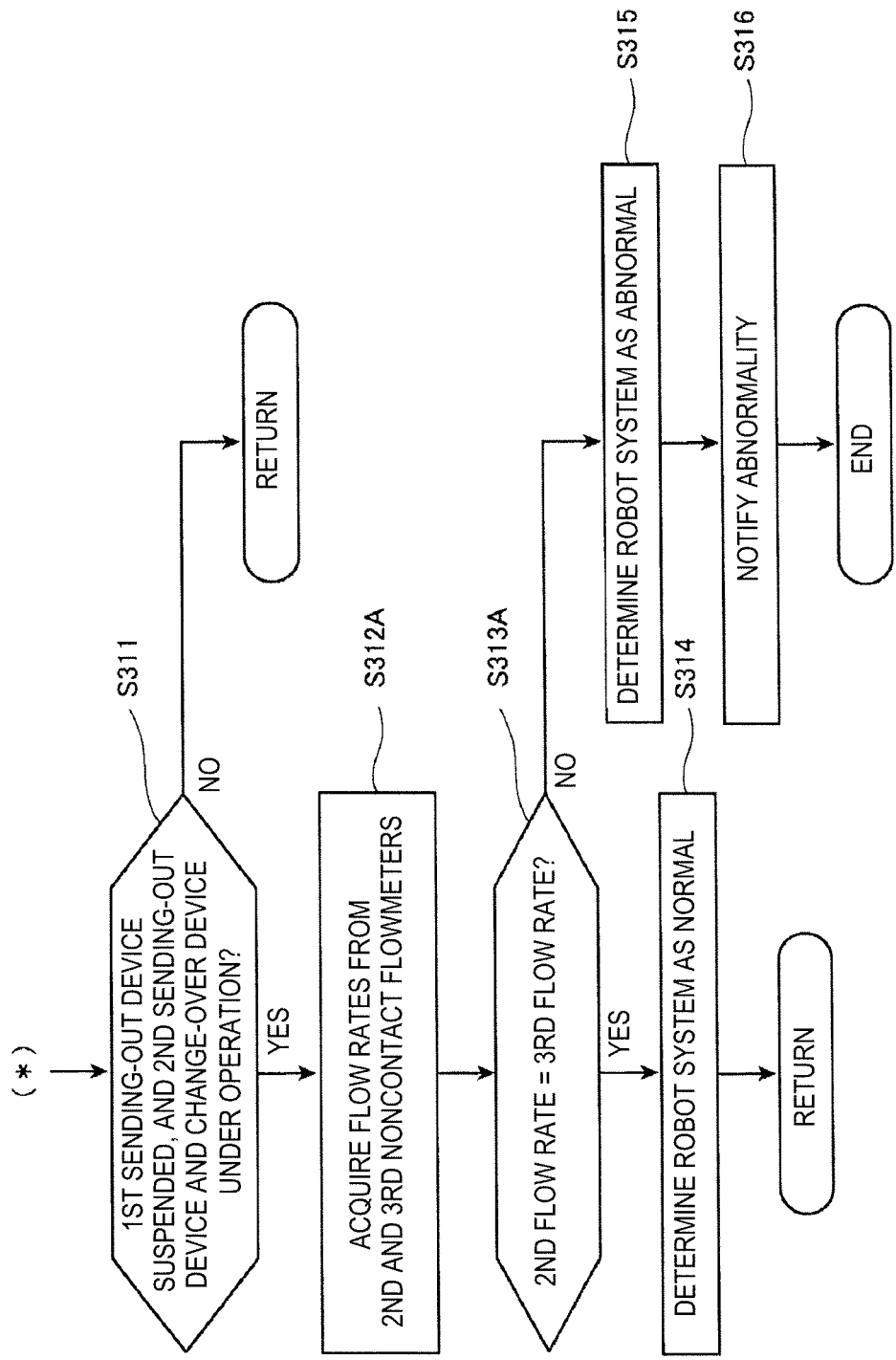
FIG. 9C is a flowchart illustrating another example of the operation of the robot system according to Embodiment 3.

FIGS. 8A to 8C are flowcharts illustrating one example of operation of the robot system according to Embodiment 3. FIGS. 9A to 9C are flowcharts illustrating another example of the operation of the robot system according to Embodiment 3. Note that the following operation is performed by the processor of the control device 70 reading a given program stored in the memory.

First, one example of operation of the robot system according to Embodiment 3 is described with reference to FIGS. 8A to 8C.

As illustrated in FIGS. 8A to 8C, the control device 70 determines whether the first sending-out device 20A, the second sending-out device 20B, and the change-over device 60 are under operation (Step S301). Note that, at Step S301, "under operation of the change-over device 60" refers to the change-over device 60 operating so that the paint flows from the second channel 42 to the first channel 41. For example, if the change-over device 60 is comprised of the three-way valve, it refers to a state of connecting ports so that the paint flows to the piping 42B.

If the control device 70 determines that the first sending-out device 20A, the second sending-out device 20B, and the change-over device 60 are not under operation (No at Step S301), it performs processing at Step S311. Note that processing at Step S311 will be described later.

On the other hand, if the control device 70 determines that the first sending-out device 20A, the second sending-out device 20B, and the change-over device 60 are under operation (Yes at Step S301), it acquires, from the second noncontact flowmeter 50B, a flow rate of the paint detected by the second noncontact flowmeter 50B (hereinafter, referred to as "the second flow rate B") (Step S302).

Next, the control device 70 determines whether the second flow rate B acquired at Step S302 is equal to the first threshold (Step S303). Here, the first threshold may be a flow rate of the paint sent out from the first sending-out device 20A (or a discharge amount of the paint discharged from the paint gun), which is inputted by the worker into the arithmetic logical unit through the input device. Moreover, the first threshold may be a value of the flow rate of the paint taking the pressure loss of the channel, the accuracy of the noncontact flowmeters 50, etc. into consideration, and, for example, it may be an arbitrary value between 95%-105% of the flow rate of the paint.

If the control device 70 determines that the second flow rate B acquired at Step S302 is equal to the first threshold (Yes at Step S303), it determines that the robot system 100 is normal (Step S304), and performs the processing at Step S301 again, for example, after 50 msec.

On the other hand, if the control device 70 determines that the second flow rate B acquired at Step S302 is not equal to the first threshold (No at Step S303), it acquires, from the third noncontact flowmeter 50C, the flow rate of the paint detected by the third noncontact flowmeter 50C (hereinafter, referred to as "the third flow rate C") (Step S305; see FIG. 8B).

Note that, at Step S303, if the second flow rate B acquired at Step S302 is above the first threshold, the control device 70 may determine that at least one instrument of the first sending-out device 20A, the second sending-out device 20B, and the second noncontact flowmeter 50B is failed (abnormal), and may inform the abnormality of the robot system 100.

Next, the control device 70 determines whether the third flow rate C acquired at Step S305 is at or below the second threshold (Step S306).

If the control device 70 determines that the third flow rate C acquired at Step S305 is at or below the second threshold (Yes at Step S306), it determines that a clogging occurs in at least one member (instrument, piping) of the change-over device 60, the first channel 41, and the second channel 42 (Step S307), causes the annunciator (not illustrated) to notify the abnormality of the robot system 100 (Step S308), and ends this program.

Note that, at Step S307, the control device 70 determines that a clogging occurs because of the following reasons. Since the flow rate detected by the third noncontact flowmeter 50C (third flow rate C) is at or below the second threshold, the paint does not flow through the third channel 43. On the other hand, since the flow rate detected by the second noncontact flowmeter 50B (second flow rate B) is not equal to the first threshold, the paint flows through the first channel 41 and the second channel 42. But, since the flow rate is not equal to the first threshold (below the first threshold), it can be considered that the clogging occurs in at least one member of the change-over device 60, the first channel 41, and the second channel 42.

On the other hand, if the control device 70 determines that the third flow rate C acquired at Step S305 is above the second threshold (No at Step S306), it determines that the paint leaks from the change-over device 60 (Step S309), causes the annunciator (not illustrated) to notify the abnormality of the robot system 100 (Step S310), and ends this program.

Moreover, if the control device 70 determines that the first sending-out device 20A, the second sending-out device 20B, and the change-over device 60 are not under operation (No at Step S301), it determines whether the first sending-out device 20A is suspended, and the second sending-out device 20B and the change-over device 60 are under operation (Step S311; see FIG. 8C).

Note that, at Step S311, "under operation of the change-over device 60" refers to the change-over device 60 operating so that the paint flows from the second channel 42 to the third channel 43. For example, if the change-over device 60 is comprised of the three-way valve, it refers to a state of connecting ports so that the paint flows from the piping 42B to the piping 43B.

If the control device 70 determines that the first sending-out device 20A is suspended, and the second sending-out device 20B and the change-over device 60 are not under operation (No at Step S311), it can be considered that the first sending-out device 20A, the second sending-out device 20B, and the change-over device 60 are suspended. In this case, since it can be considered that the second noncontact flowmeter 50B and the third noncontact flowmeter 50C do not detect the flow rate of the paint, the control device 70 performs the processing at Step S301 again, for example, after 50 msec.

Note that, if the control device 70 determines that the first sending-out device 20A is suspended, and the second sending-out device 20B and the change-over device 60 are not under operation (No at Step S311), when the second noncontact flowmeter 50B and/or the third noncontact flowmeter 50C detect the flow rate of the paint, it may be determined that at least one or more instruments of the first sending-out device 20A, the second sending-out device 20B, the second noncontact flowmeter 50B, and the third noncontact flowmeter 50C is abnormal (failed).

On the other hand, if the control device 70 determines that the first sending-out device 20A is suspended, and the second sending-out device 20B and the change-over device 60 are under operation (Yes at Step S311), it acquires, from the third noncontact flowmeter 50C, the flow rate of the paint detected by the third noncontact flowmeter 50C (third flow rate C) (Step S312).

Next, the control device 70 determines whether the third flow rate C acquired at Step S312 is equal to a third threshold (Step S313). Here, the third threshold may be a flow rate of the paint sent out from the second sending-out device 20B, which is inputted by the worker into the arithmetic logical unit through the input device. Moreover, the third threshold may be a value of the flow rate of the paint taking into consideration the pressure loss of the channel, the accuracy of the third noncontact flowmeter 50C, etc., and, for example, it may be an arbitrary value between 95%-105% of the flow rate of the paint.

If the control device 70 determines that the third flow rate C acquired at Step S312 is equal to the third threshold (Yes at Step S313), it determines that the robot system 100 is normal (Step S314), and performs the processing at Step S301 again, for example, after 50 msec.

On the other hand, if the control device 70 determines that the third flow rate C acquired at Step S312 is not equal to the third threshold (No at Step S313), it determines that the robot system 100 is abnormal (Step S315), causes the annunciator (not illustrated) to notify the abnormality of the robot system 100 (Step S316), and ends this program.

Note that, in the processing at Step S315, the control device 70 may acquire, from the second noncontact flowmeter 50B, the flow rate of the paint detected by the second noncontact flowmeter 50B (second flow rate B), and if the flow rate (third flow rate C) acquired at Step S312 is below the second flow rate B, it may determine that a clogging occurs in the change-over device 60 and/or the third channel 43. Moreover, in the processing at Step S315, if the third flow rate C is above the second flow rate B, the control device 70 may determine that the second noncontact flowmeter 50B and/or the third noncontact flowmeter 50C is failed.

Next, another example of the operation of the robot system according to Embodiment 3 is described with reference to FIGS. 9A to 9C.

As illustrated in FIGS. 9A to 9C, another example of the operation of the robot system according to Embodiment 3 is the same in the fundamental operation as the one example of the operation of the robot system according to Embodiment 3 described above, but it differs in that processings at Steps S312A and S313A are performed, instead of the processing at Steps S312 and S313.

In detail, if the control device 70 determines that the first sending-out device 20A is suspended, and the second sending-out device 20B and the change-over device 60 are under operation (Yes at Step S311), it acquires, from the second noncontact flowmeter 50B, the flow rate of the paint detected by the second noncontact flowmeter 50B (second flow rate B), and acquires, from the third noncontact flowmeter 50C, the flow rate of the paint detected by the third noncontact flowmeter 50C (third flow rate C) (Step S312A).

Next, the control device 70 determines whether the second flow rate B acquired at Step S312A is the same as the third flow rate C (Step 313A).

If the control device 70 determines that the second flow rate B acquired at Step S312A is the same as the third flow rate C (Yes at Step S313A), it determines that the robot system 100 is normal (Step S314), and performs the processing at Step S301 again, for example, after 50 msec.

On the other hand, if the control device 70 determines that the second flow rate B acquired at Step S312A is not the same as the third flow rate C (No at Step S313A), it determines that the robot system 100 is abnormal (Step S315), causes the annunciator (not illustrated) to notify the abnormality of the robot system 100 (Step S316), and ends this program.

The robot system 100 according to Embodiment 3 configured in this way also has similar operation and effects to the robot system 100 according to Embodiment 1.

Embodiment 4

A robot system according to Embodiment 4 may be configured such that the channel has a first channel which connects the sending-out device to the painting robot, and the noncontact flowmeter is disposed in a first piping which constitutes the first channel and is disposed in the non-explosion-proof area, in the robot system according to any one of Embodiments 1 to 3 (including the modifications).

Alternatively, in the robot system according to Embodiment 4, the channel may have a second channel which connects the paint supply source to the sending-out device, and the noncontact flowmeter may be disposed in a second piping which constitutes the second channel and is disposed in the non-explosion-proof area.

Alternatively, in the robot system according to Embodiment 4, the channel may have a first channel which connects the sending-out device to the painting robot, a second channel which connects the paint supply source to the sending-out device, and a third channel. At an intermediate location of the second channel, the change-over device may be disposed, the third channel may connect the change-over device to the paint supply source. The noncontact flowmeter may be disposed in at least two of a first piping which constitutes the first channel and is disposed in the non-explosion-proof area, a second piping which constitutes the second channel and is disposed in the non-explosion-proof area, and a third piping which constitutes the third channel and is disposed in the non-explosion-proof area.

Alternatively, the robot system according to Embodiment 4 may further be provided with a control device. The control device may be configured to receive the flow rate of the paint detected by the noncontact flowmeter, and control the operation of the sending-out device. The control device may be configured to determine whether an abnormality occurs in the channel based on the flow rate of the paint detected by the noncontact flowmeter, and the existence of the operation of the sending-out device.

Below, one example of the robot system according to Embodiment 4 is described in detail with reference to FIGS. 10 to 11C.

[Configuration of Robot System]

Figure 10:
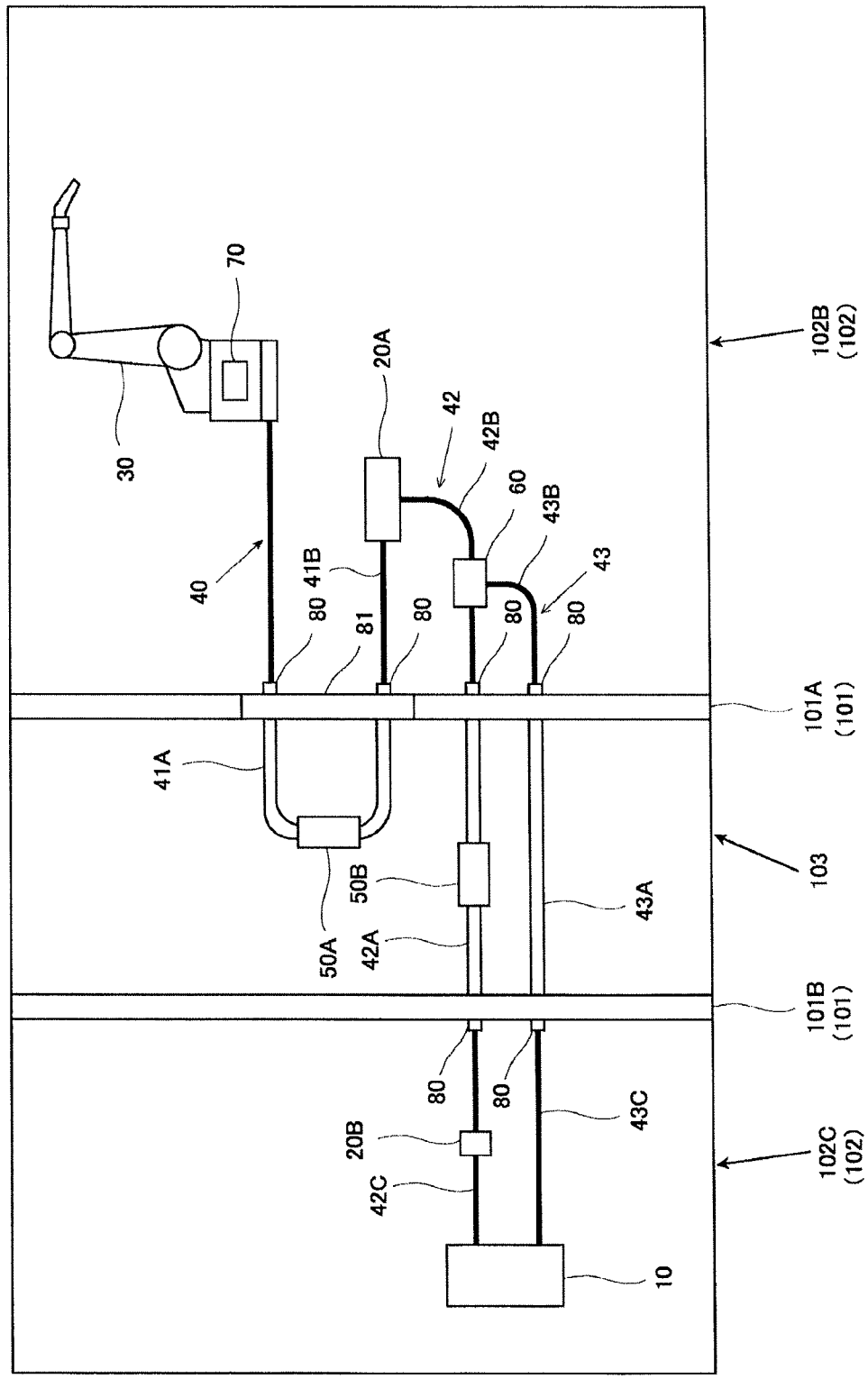
FIG. 10 is a schematic view illustrating an outline configuration of a robot system according to Embodiment 4.

FIG. 10 is a schematic view illustrating an outline configuration of the robot system according to Embodiment 4.

As illustrated in FIG. 10, the robot system 100 according to Embodiment 4 is the same in the fundamental configuration as the robot system 100 according to Embodiment 1, but it differs in that the third channel 43 which connects the change-over device 60 to the paint supply source 10 is provided, two sending-out devices (a first sending-out device 20A and a second sending-out device 20B) are provided, and two noncontact flowmeters 50 (a first noncontact flowmeter 50A and a second noncontact flowmeter 50B) are provided.

Note that, among the pipings which constitute the third channel 43, the piping disposed in the non-explosion-proof area 103 is referred to as "the third piping 43A," the piping disposed in the second explosion-proof area 102B is referred to as "the piping 43B," and the piping disposed in the first explosion-proof area 102C is referred to as "the piping 43C."

Moreover, in Embodiment 4, the change-over device 60 may be comprised of a three-way valve, or may be comprised of a two-way valve disposed in each of the piping 42B and the piping 43B.

The first sending-out device 20A may be configured to send out the paint to the paint gun of the painting robot 30, and, for example, it may be comprised of a gear pump. Moreover, the second sending-out device 20B may be configured to circulate the paint, and it may be comprised of a plunger pump.

In detail, the first sending-out device 20A is disposed in a part of the piping 42B downstream of the change-over device 60. The second sending-out device 20B is disposed in the piping 42C. Note that the second sending-out device 20B may be disposed in the piping 43C.

The first noncontact flowmeter 50A is disposed in the first piping 41A, and the second noncontact flowmeter 50B is disposed in the second piping 42A. The first noncontact flowmeter 50A and the second noncontact flowmeter 50B may be comprised of noncontact flowmeters of the same type (e.g., ultrasonic flowmeters), or may be comprised of noncontact flowmeters of different types (e.g., an ultrasonic flowmeter and a magnetic flowmeter).

[Operation and Effects of Robot System]

Next, operation and effects of the robot system 100 according to Embodiment 4 are described with reference to FIGS. 10 to 11C.

Figure 11A:
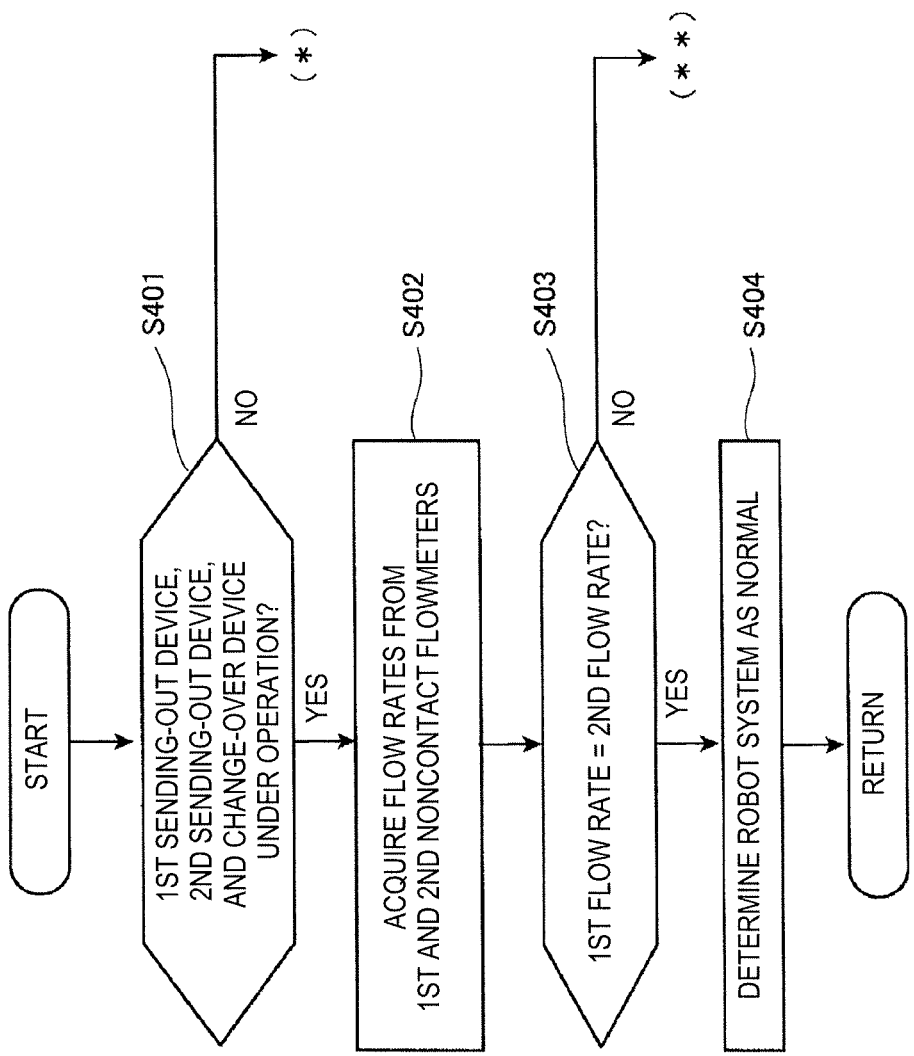
FIG. 11A is a flowchart illustrating one example of operation of the robot system according to Embodiment 4.
Figure 11B:
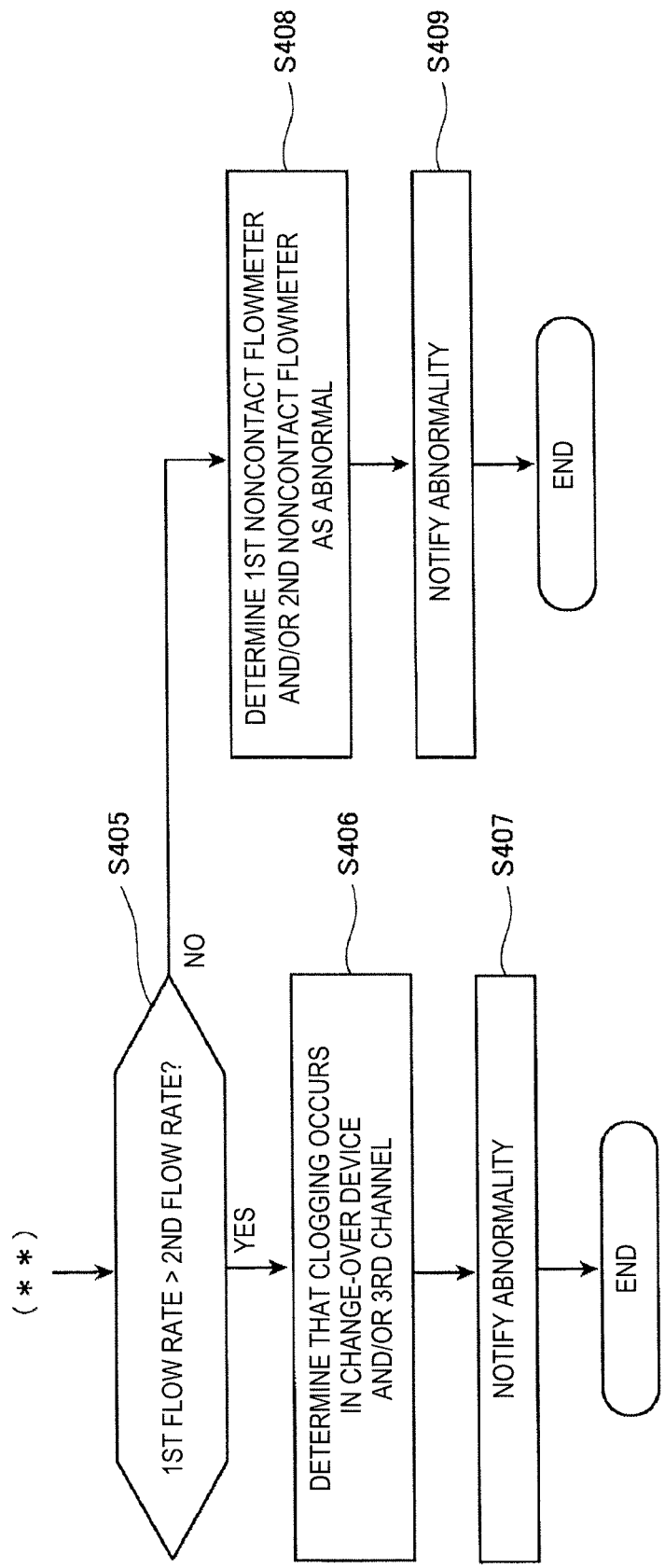
FIG. 11B is a flowchart illustrating one example of the operation of the robot system according to Embodiment 4.
Figure 11C:
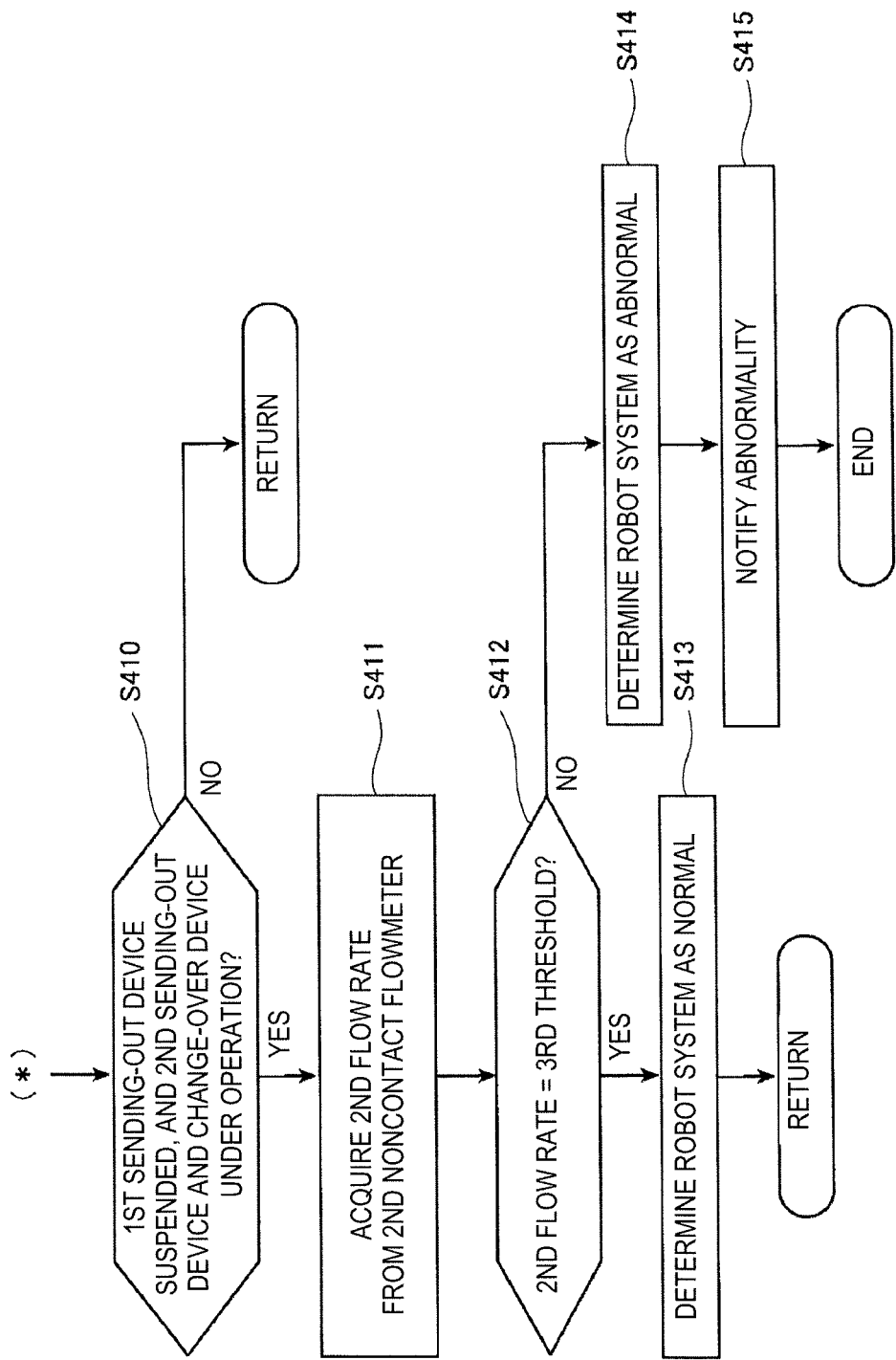
FIG. 11C is a flowchart illustrating one example of the operation of the robot system according to Embodiment 4.

FIGS. 11A to 11C are flowcharts illustrating one example of operation of the robot system according to Embodiment 4. Note that the following operation is performed by the processor of the control device 70 reading a given program stored in the memory.

As illustrated in FIGS. 11A to 11C, the control device 70 determines whether the first sending-out device 20A, the second sending-out device 20B, and the change-over device 60 are under operation (Step S401). Note that, at Step S401, "under operation of the change-over device 60" refers to the change-over device 60 operating so that the paint flows from the second channel 42 to the first channel 41. For example, if the change-over device 60 is comprised of the three-way valve, it refers to a state of connecting ports so that the paint flows to the piping 42B.

If the control device 70 determines that the first sending-out device 20A, the second sending-out device 20B, and the change-over device 60 are not under operation (No at Step S401), it performs processing at Step S410. Note that processing at Step S410 will be described later.

On the other hand, if the control device 70 determines that the first sending-out device 20A, the second sending-out device 20B, and the change-over device 60 are under operation (Yes at Step S401), it acquires, from the first noncontact flowmeter 50A, the flow rate of the paint detected by the first noncontact flowmeter 50A (hereinafter, referred to as "the first flow rate A"), and acquires, from the second noncontact flowmeter 50B, the flow rate of the paint detected by the second noncontact flowmeter 50B (hereinafter, referred to as "the second flow rate B") (Step S402).

Next, the control device 70 determines whether the first flow rate A and the second flow rate B which are acquired at Step S402 are the same (Step 403).

If the control device 70 determines that the first flow rate A and the second flow rate B which are acquired at Step S402 are the same (Yes at Step S403), it determines that the robot system 100 is normal (Step S404), and performs processing at Step S401 again, for example, after 50 msec.

On the other hand, if the control device 70 determines whether the first flow rate A and the second flow rate B which are acquired at Step S402 are not the same (No at Step S403), it then determines whether the first flow rate A acquired at Step S402 is above the second flow rate B (Step S405; see FIG. 11B).

If the control device 70 determines that the first flow rate A acquired at Step S402 is above the second flow rate B acquired at Step S402 (Yes at Step S405), it determines that a clogging occurs in the change-over device 60 and/or the third channel 43 (Step S406), causes the annunciator (not illustrated) to notify the abnormality of the robot system 100 (Step S407), and ends this program.

On the other hand, if the control device 70 determines that the first flow rate A acquired at Step S402 is below the second flow rate B acquired at Step S402 (No at Step S405), it determines that an abnormality occurs in the first noncontact flowmeter 50A and/or the second noncontact flowmeter 50B (Step S408), causes the annunciator (not illustrated) to notify the abnormality of the robot system 100 (Step S409), and ends this program.

Moreover, if the control device 70 determines that the first sending-out device 20A, the second sending-out device 20B, and the change-over device 60 are not under operation (No at Step S401), it determines whether the first sending-out device 20A is suspended, and the second sending-out device 20B and the change-over device 60 are under operation (Step S410; see FIG. 11C).

Note that, at Step S410, "under operation of the change-over device 60" refers to the change-over device 60 operating so that the paint flows from the second channel 42 to the third channel 43. For example, if the change-over device 60 is comprised of the three-way valve, it refers to a state of connecting ports so that the paint flows from the piping 42B to the piping 43B.

If the control device 70 determines that the first sending-out device 20A is suspended, and the second sending-out device 20B and the change-over device 60 are not under operation (No at Step S410), it can be considered that the first sending-out device 20A, the second sending-out device 20B, and the change-over device 60 are suspended. In this case, since it can be considered that the second noncontact flowmeter 50B and the third noncontact flowmeter 50C do not detect the flow rate of the paint, the control device 70 performs processing at Step S401 again, for example, after 50 msec.

Note that, if the control device 70 determines that the first sending-out device 20A is suspended, and the second sending-out device 20B and the change-over device 60 are not under operation (No at Step S410), when the first noncontact flowmeter 50A and/or the second noncontact flowmeter 50B detect the flow rate of the paint, it may determine that at least one or more instrument of the first sending-out device 20A, the second sending-out device 20B, the first noncontact flowmeter 50A, and the second noncontact flowmeter 50B is abnormal (failed).

On the other hand, if the control device 70 determines that the first sending-out device 20A is suspended, and the second sending-out device 20B and the change-over device 60 are under operation (Yes at Step S410), it acquires, from the second noncontact flowmeter 50B, the flow rate of the paint detected by the second noncontact flowmeter 50B (second flow rate B) (Step S411).

Next, the control device 70 determines whether the second flow rate B acquired at Step S411 is equal to a third threshold (Step S412). Here, the third threshold may be a flow rate of the paint sent out from the second sending-out device 20B, which is inputted by the worker into the arithmetic logical unit through the input device. Moreover, the third threshold may be a value of the flow rate of the paint taking into consideration the pressure loss of the channel, the accuracy of the third noncontact flowmeter 50C, etc., and, for example, it may be an arbitrary value between 95%-105% of the flow rate of the paint.

If the control device 70 determines that the second flow rate B acquired at Step S411 is equal to the third threshold (Yes at Step S412), it determines that the robot system 100 is normal (Step S413), and performs processing at Step S401 again, for example, after 50 msec.

On the other hand, if the control device 70 determines that the second flow rate B acquired at Step S411 is not equal to the third threshold (No at Step S412), it determines that the robot system 100 is abnormal (Step S414), causes the annunciator (not illustrated) to notify the abnormality of the robot system 100 (Step S415), and ends this program.

Note that the abnormality of the robot system 100 includes a failure of at least one instrument of the second sending-out device 20B, the second noncontact flowmeter 50B, and the change-over device 60, and/or a leakage of the paint from the channel 40, a clogging, etc.

For example, if the second flow rate B acquired at Step S411 is above the third threshold, the control device 70 may determine that the second sending-out device 20B and/or the second noncontact flowmeter 50B is failed. Moreover, for example, if the flow rate acquired at Step S411 is below the third threshold, the control device 70 may determine that an abnormality, such as the leakage of the paint from the change-over device 60 and/or the channel 40 or clogging.

The robot system 100 according to Embodiment 4 configured in this way also has similar operation and effects to the robot system 100 according to Embodiment 1.

Embodiment 5

A robot system according to Embodiment 5 may be configured such that the channel has a first channel which connects the sending-out device to the painting robot, and the noncontact flowmeter is disposed in a first piping which constitutes the first channel and is disposed in the non-explosion-proof area, in the robot system according to any one of Embodiments 1 to 4 (including the modifications).

Alternatively, in the robot system according to Embodiment 5, the channel may have a second channel which connects the paint supply source to the sending-out device, and a third channel. At an intermediate location of the second channel, the change-over device may be disposed. The third channel may connect the change-over device to the paint supply source, and the noncontact flowmeter may be disposed in a third piping which constitutes the third channel and is disposed in the non-explosion-proof area.

Alternatively, in the robot system according to Embodiment 5, the channel may have a first channel which connects the sending-out device to the painting robot, a second channel which connects the paint supply source to the sending-out device, and a third channel. At an intermediate location of the second channel, the change-over device may be disposed. The third channel may connect the change-over device to the paint supply source. The noncontact flowmeter may be disposed in at least two of a first piping which constitutes the first channel and is disposed in the non-explosion-proof area, a second piping which constitutes the second channel and is disposed in the non-explosion-proof area, and a third piping which constitutes the third channel and is disposed in the non-explosion-proof area.

Alternatively, the robot system according to Embodiment 5 may further be provided with a control device. A flow rate of the paint detected by the noncontact flowmeter may be inputted into the control device, and the control device may control operation of the sending-out device. The control device may determine whether an abnormality occurs in the channel based on the flow rate of the paint detected by the noncontact flowmeter, and the existence of the operation of the sending-out device.

Below, one example of the robot system according to Embodiment 5 is described in detail with reference to FIGS. 12 to 13C.

[Configuration of Robot System]

Figure 12:
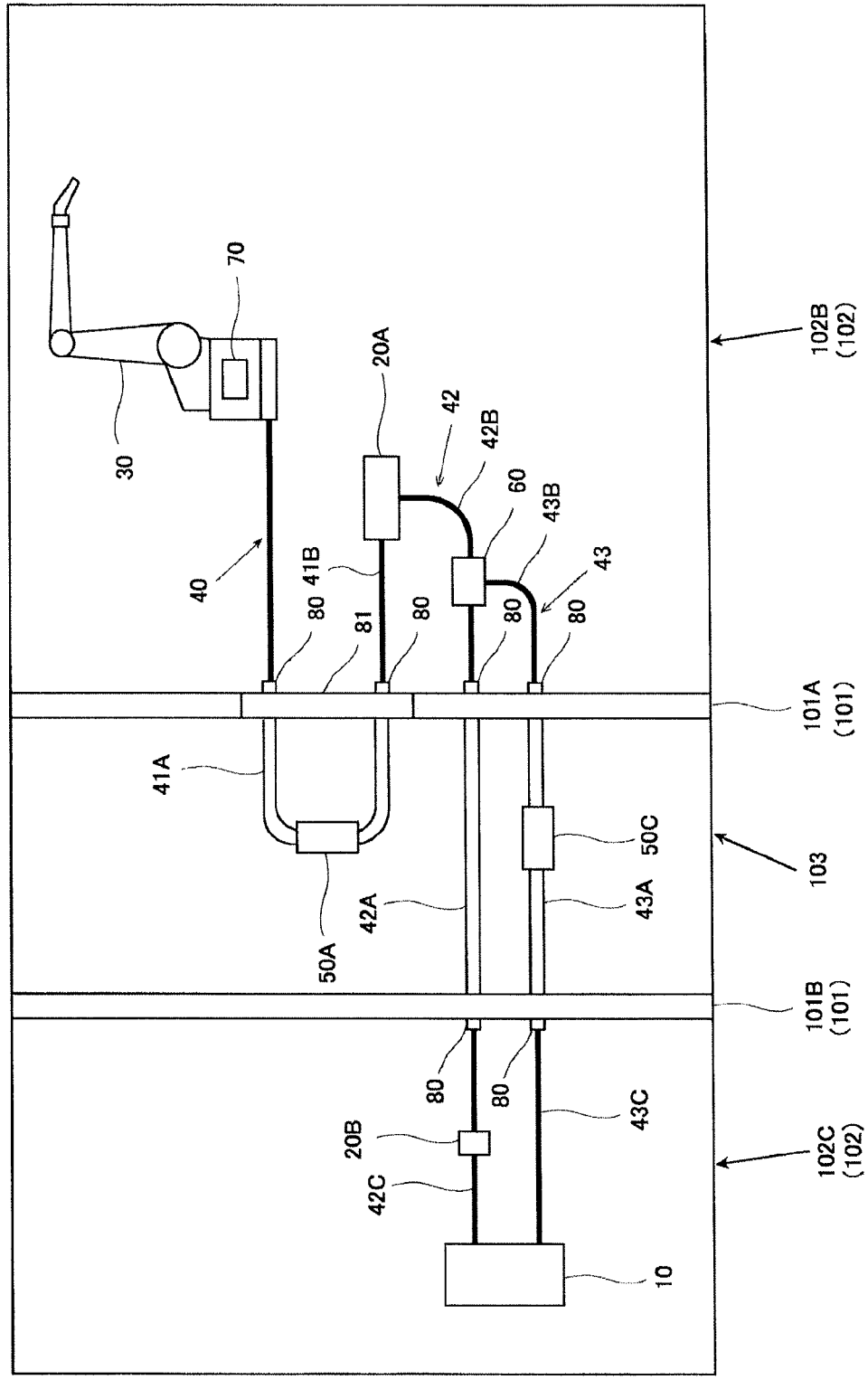
FIG. 12 is a schematic view illustrating an outline configuration of a robot system according to Embodiment 5.

FIG. 12 is a schematic view illustrating an outline configuration of the robot system according to Embodiment 5.

As illustrated in FIG. 12, the robot system 100 according to Embodiment 5 is the same in the fundamental configuration as the robot system 100 according to Embodiment 1, but it differs in that the third channel 43 which connects the change-over device 60 to the paint supply source 10 is provided, two sending-out devices (a first sending-out device 20A and a second sending-out device 20B) are provided, and two noncontact flowmeters 50 (a first noncontact flowmeter 50A and a third noncontact flowmeter 50C) are provided.

Note that, among the pipings which constitute the third channel 43, the piping disposed in the non-explosion-proof area 103 is referred to as "the third piping 43A," the piping disposed in the second explosion-proof area 102B is referred to as "the piping 43B," and the piping disposed in the first explosion-proof area 102C is referred to as "the piping 43C."

Moreover, in Embodiment 5, the change-over device 60 may be comprised of a three-way valve, or may be comprised of a two-way valve disposed in each of the piping 42B and the piping 43B.

The first sending-out device 20A may be configured to send out the paint to the paint gun of the painting robot 30, and, for example, it may be comprised of a gear pump. Moreover, the second sending-out device 20B may be configured to circulate the paint, and it may be comprised of a plunger pump.

In detail, the first sending-out device 20A is disposed in a part of the piping 42B downstream of the change-over device 60. The second sending-out device 20B is disposed in the piping 42C. Note that the second sending-out device 20B may be disposed in the piping 43C.

The first noncontact flowmeter 50A is disposed in the first piping 41A, and the third noncontact flowmeter 50C is disposed in the third piping 43A. The first noncontact flowmeter 50A and the third noncontact flowmeter 50C may be comprised of noncontact flowmeters of the same type (e.g., ultrasonic flowmeters), or may be comprised of noncontact flowmeters of different types (e.g., an ultrasonic flowmeter and a magnetic flowmeter).

[Operation and Effects of Robot System]

Next, operation and effects of the robot system 100 according to Embodiment 5 are described with reference to FIGS. 12 to 13C.

Figure 13A:
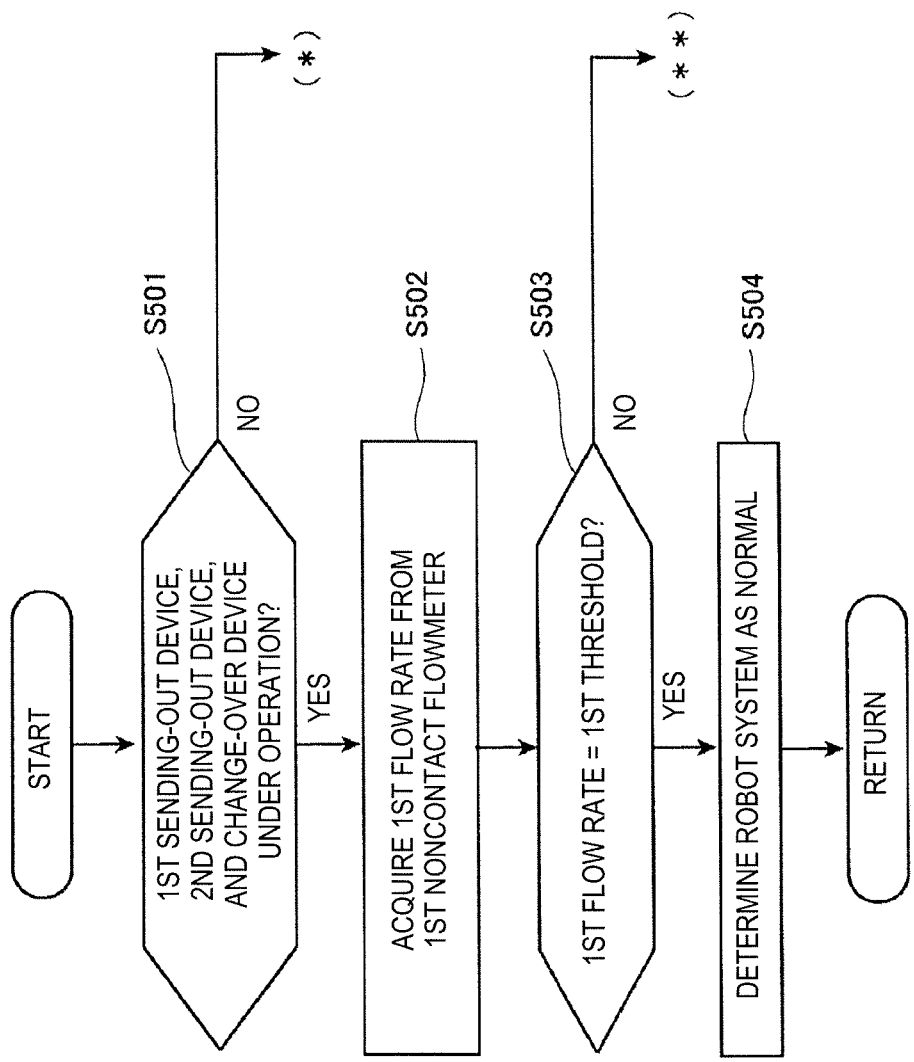
FIG. 13A is a flowchart illustrating one example of operation of the robot system according to Embodiment 5.
Figure 13B:
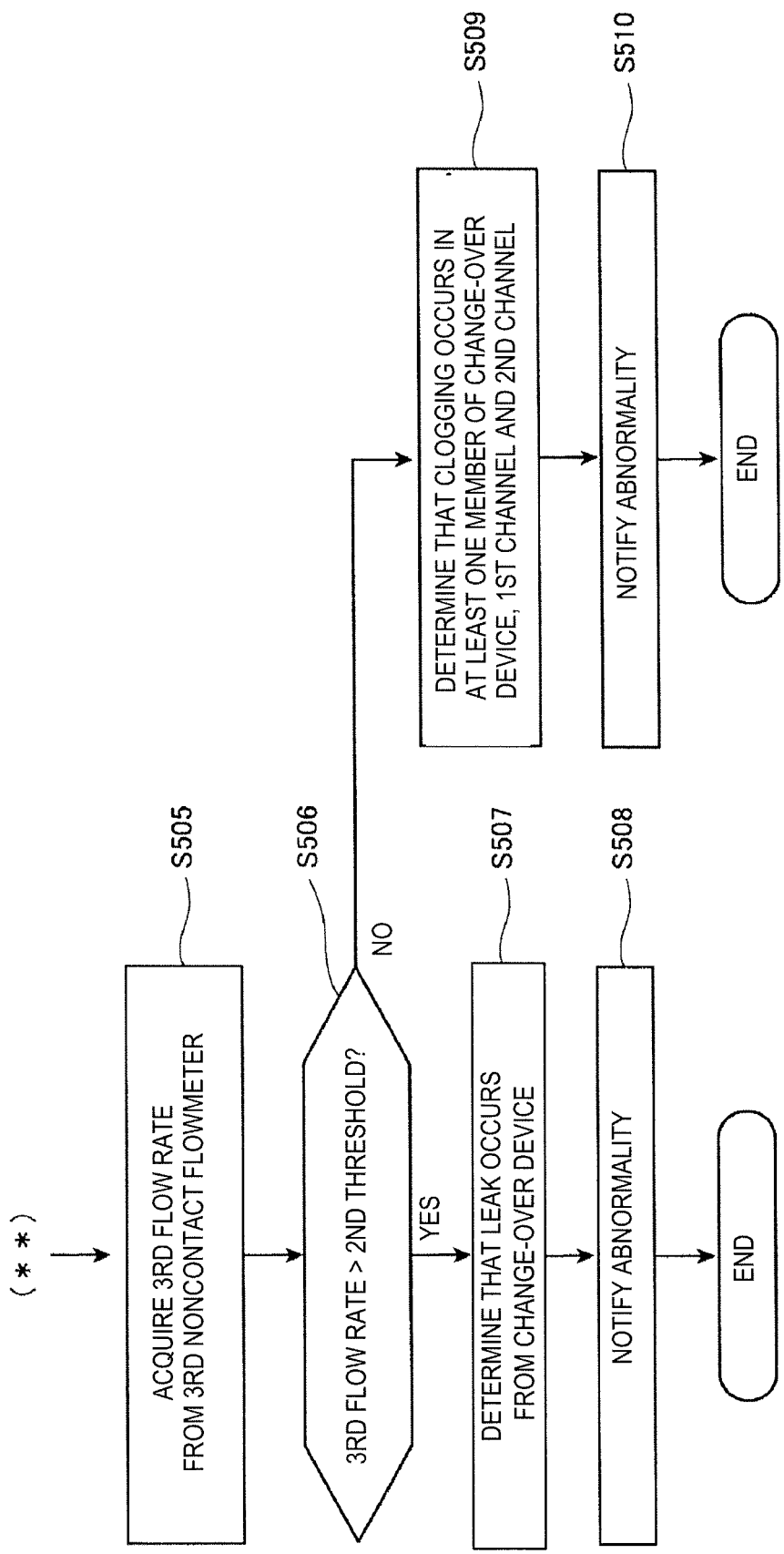
FIG. 13B is a flowchart illustrating one example of the operation of the robot system according to Embodiment 5.
Figure 13C:
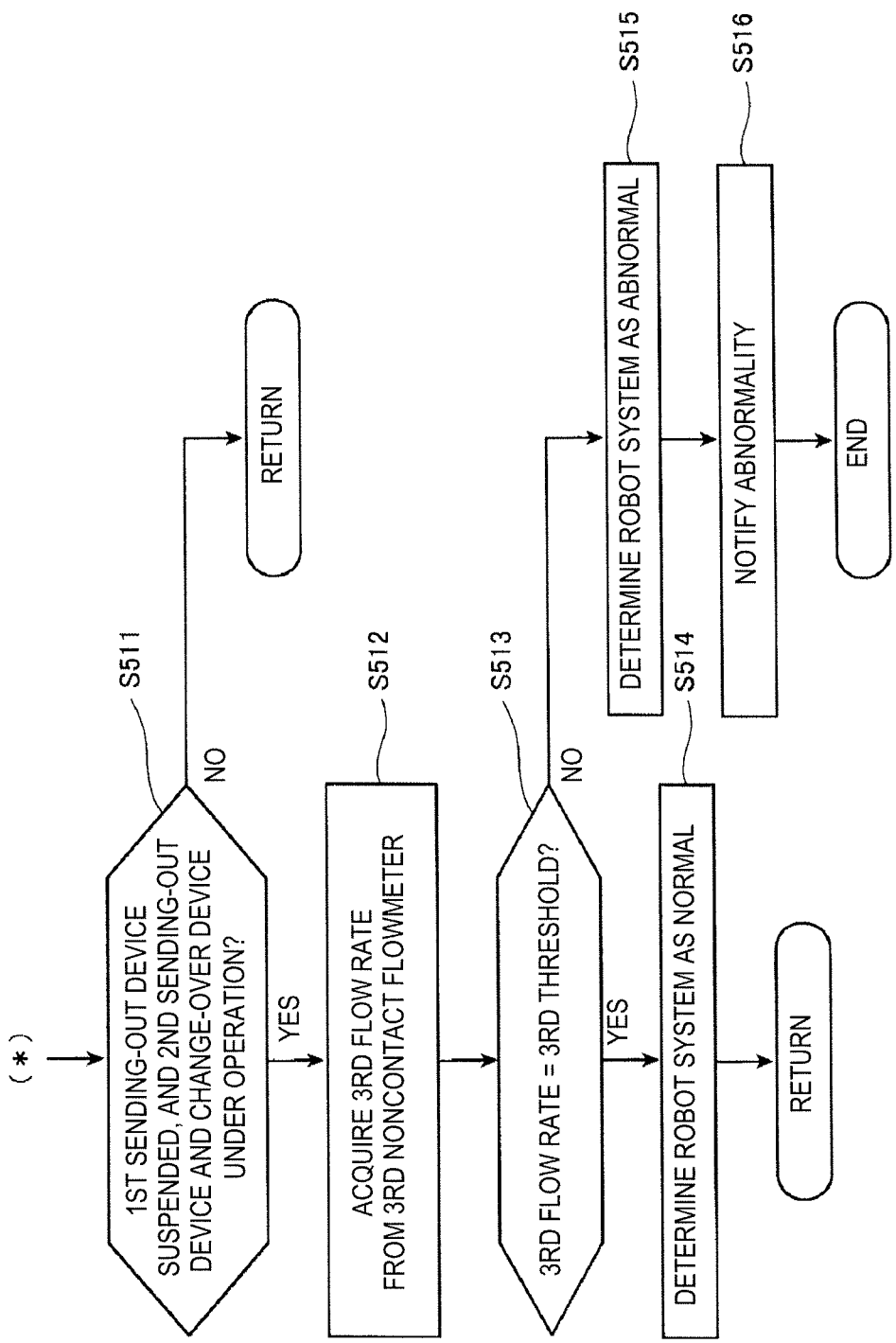
FIG. 13C is a flowchart illustrating one example of the operation of the robot system according to Embodiment 5.

FIGS. 13A to 13C are flowcharts illustrating one example of operation of the robot system according to Embodiment 5. Note that the following operation is performed by the processor of the control device 70 reading a given program stored in the memory.

As illustrated in FIGS. 13A to 13C, the control device 70 determines whether the first sending-out device 20A, the second sending-out device 20B, and the change-over device 60 are under operation (Step S501). Note that, at Step S501, "under operation of the change-over device 60" refers to the change-over device 60 operating so that the paint flows from the second channel 42 to the first channel 41. For example, if the change-over device 60 is comprised of the three-way valve, it refers to a state of connecting ports so that the paint flows to the piping 42B.

If the control device 70 determines that the first sending-out device 20A, the second sending-out device 20B, and the change-over device 60 are not under operation (No at Step S501), it performs processing at Step S511. Note that processing at Step S511 will be described later.

On the other hand, if the control device 70 determines that the first sending-out device 20A, the second sending-out device 20B, and the change-over device 60 are under operation (Yes at Step S501), it acquires, from the first noncontact flowmeter 50A, the flow rate (hereinafter, referred to as "the first flow rate A") of the paint detected by the first noncontact flowmeter 50A (Step S502).

Next, the control device 70 determines whether the first flow rate A acquired at Step S502 is equal to the first threshold (Step S503).

If the control device 70 determines that the first flow rate A acquired at Step S502 is equal to the first threshold (Yes at Step S503), it determines that the robot system 100 is normal (Step S504), and performs processing at Step S501 again, for example, after 50 msec.

On the other hand, if the control device 70 determines that the first flow rate A acquired at Step S502 is not equal to the first threshold (No at Step S503), it acquires, from the third noncontact flowmeter 50C, the flow rate of the paint detected by the third noncontact flowmeter 50C (hereinafter, referred to as "the third flow rate C") (Step S505; see FIG. 13B).

Note that, at Step S503, if the first flow rate A acquired at Step S502 is above the first threshold, the control device 70 may determine that at least one instrument of the first sending-out device 20A, the second sending-out device 20B, and the first noncontact flowmeter 50A is failed (abnormal), and may inform the abnormality of the robot system 100.

Next, the control device 70 determines whether the third flow rate C acquired at Step S505 is above the second threshold (Step S506).

If the control device 70 determines that the third flow rate C acquired at Step S505 is above the second threshold (Yes at Step S506), it determines that the paint leaks from the change-over device 60 (Step S507), causes the annunciator (not illustrated) to notify the abnormality of the robot system 100 (Step S508), and ends this program.

On the other hand, if the control device 70 determines that the third flow rate C acquired at Step S505 is at or below the second threshold (No at Step S506), it determines that a clogging occurs in at least one member (instrument, piping) of the change-over device 60, the first channel 41, and the second channel 42 (Step S509), causes the annunciator (not illustrated) to notify the abnormality of the robot system 100 (Step S510), and ends this program.

Note that, at Step S509, the control device 70 determines that a clogging occurs based on the following reasons. Since the flow rate detected by the third noncontact flowmeter 50C (third flow rate C) is at or below the second threshold, the paint does not flow through the third channel 43. On the other hand, since the flow rate detected by the first noncontact flowmeter 50A (first flow rate A) is not equal to the first threshold, the paint flows through the first channel 41 and the second channel 42. But, since the flow rate is not equal to the first threshold (below the first threshold), it can be considered that the clogging occurs in at least one member of the change-over device 60, the first channel 41, and the second channel 42.

Moreover, if the control device 70 determines that the first sending-out device 20A, the second sending-out device 20B, and the change-over device 60 are not under operation (No at Step S501), it determines whether the first sending-out device 20A is suspended, and the second sending-out device 20B and the change-over device 60 are under operation (Step S511; see FIG. 13C).

Note that, at Step S511, "under operation of the change-over device 60" refers to the change-over device 60 operating so that the paint flows from the second channel 42 to the third channel 43. For example, if the change-over device 60 is comprised of the three-way valve, it refers to a state of connecting ports so that the paint flows from the piping 42B to the piping 43B.

If the control device 70 determines that the first sending-out device 20A is suspended, and the second sending-out device 20B and the change-over device 60 are not under operation (No at Step S511), it can be considered that the first sending-out device 20A, the second sending-out device 20B, and the change-over device 60 are suspended. In this case, since it can be considered that the second noncontact flowmeter 50B and the third noncontact flowmeter 50C do not detect the flow rate of the paint, the control device 70 performs processing at Step S501 again, for example, after 50 msec.

Note that, if the control device 70 determines that the first sending-out device 20A is suspended, and the second sending-out device 20B and the change-over device 60 are not under operation (No at Step S511), when the second noncontact flowmeter 50B and/or the third noncontact flowmeter 50C detect the flow rate of the paint, it may determine that at least one or more instrument of the first sending-out device 20A, the second sending-out device 20B, the second noncontact flowmeter 50B, and the third noncontact flowmeter 50C is abnormal (failed).

On the other hand, if the control device 70 determines that the first sending-out device 20A is suspended, and the second sending-out device 20B and the change-over device 60 are under operation (Yes at Step S511), it acquires, from the third noncontact flowmeter 50C, the flow rate of the paint detected by the third noncontact flowmeter 50C (third flow rate C) (Step S512).

Next, the control device 70 determines whether the third flow rate C acquired at Step S512 is equal to a third threshold (Step S513). Here, the third threshold may be a flow rate of the paint sent out from the second sending-out device 20B, which is inputted by the worker into the arithmetic logical unit through the input device. Moreover, the third threshold may be a value of the flow rate of the paint taking into consideration the pressure loss of the channel, the accuracy of the third noncontact flowmeter 50C, etc., and, for example, it may be an arbitrary value between 95%-105% of the flow rate of the paint.

If the control device 70 determines that the third flow rate C acquired at Step S512 is equal to the third threshold (Yes at Step S513), it determines that the robot system 100 is normal (Step S514), and performs processing at Step S501 again, for example, after 50 msec.

On the other hand, if the control device 70 determines that the third flow rate C acquired at Step S512 is not equal to the third threshold (No at Step S513), it determines that the robot system 100 is abnormal (Step S515), causes the annunciator (not illustrated) to notify the abnormality of the robot system 100 (Step S516), and ends this program.

Note that, in processing at Step S515, if the flow rate (third flow rate C) acquired at Step S512 is below the third threshold, the control device 70 may determine that a clogging occurs in the change-over device 60 and/or the third channel 43. Moreover, in processing at Step S515, if the third flow rate C is above the third threshold, the control device 70 may determine that the second sending-out device 20B and/or the third noncontact flowmeter 50C is failed.

Moreover, in processing at Step S515, the control device 70 may acquire, from the first noncontact flowmeter 50A, the flow rate of the paint detected by the first noncontact flowmeter 50A (first flow rate A), and if the first flow rate A is above the second threshold, it may determine that the paint leaks from the change-over device 60.

The robot system 100 according to Embodiment 5 configured in this way also has similar operation and effects to the robot system 100 according to Embodiment 1.

Embodiment 6

A robot system according to Embodiment 6 may be configured such that the channel has a first channel which connects the sending-out device to the painting robot, and the noncontact flowmeter is disposed in a first piping which constitutes the first channel and is disposed in the non-explosion-proof area, in the robot system according to any one of Embodiments 1 to 5 (including the modifications).

Alternatively, in the robot system according to Embodiment 6, the channel may have a second channel which connects the paint supply source to the sending-out device, and a third channel. At an intermediate location of the second channel, the change-over device may be disposed, and the third channel may connect the change-over device to the paint supply source. The noncontact flowmeter may be disposed in a third piping which constitutes the third channel and is disposed in the non-explosion-proof area.

Alternatively, in the robot system according to Embodiment 6, the channel may have a second channel which connects the paint supply source to the sending-out device, and the noncontact flowmeter may be disposed in a second piping which constitutes the second channel and is disposed in the non-explosion-proof area.

Alternatively, in the robot system according to Embodiment 6, the channel may have a first channel which connects the sending-out device to the painting robot, a second channel which connects the paint supply source to the sending-out device, and a third channel. At an intermediate location of the second channel, the change-over device may be disposed, the third channel may connect the change-over device to the paint supply source. The noncontact flowmeter may be disposed in at least two of a first piping which constitutes the first channel and is disposed in the non-explosion-proof area, a second piping which constitutes the second channel and is disposed in the non-explosion-proof area, and a third piping which constitutes the third channel and is disposed in the non-explosion-proof area.

Alternatively, the robot system according to Embodiment 6 may further be provided with a control device. A flow rate of the paint detected by the noncontact flowmeter may be inputted into the control device, and the control device may control operation of the sending-out device. The control device may determine whether an abnormality occurs in the channel based on the flow rate of the paint detected by the noncontact flowmeter, and the existence of the operation of the sending-out device.

Below, one example of the robot system according to Embodiment 6 is described in detail with reference to FIG. 14. Note that, since operation of the robot system according to Embodiment 6 is performed similarly to the operation of the robot system 100 according to any one of Embodiments 1 to 5 (including the modifications), the detailed description is omitted.

[Configuration of Robot System]

Figure 14:
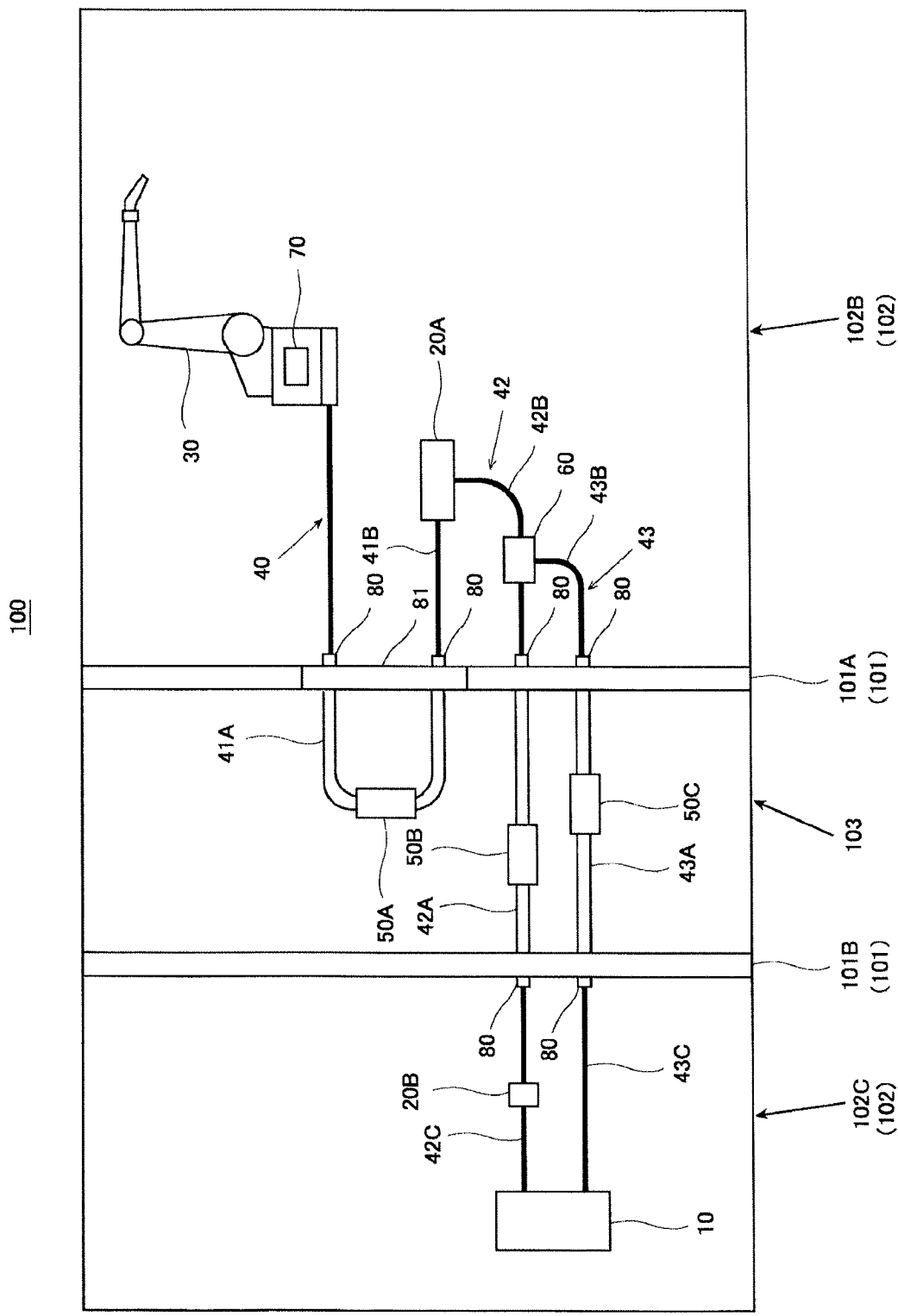
FIG. 14 is a schematic view illustrating an outline configuration of a robot system according to Embodiment 6.

FIG. 14 is a schematic view illustrating an outline configuration of the robot system according to Embodiment 6.

As illustrated in FIG. 14, the robot system 100 according to Embodiment 6 is the same in the fundamental configuration as the robot system 100 according to Embodiment 1, but it differs in that a third channel 43 which connects the change-over device 60 to the paint supply source 10 is provided, two sending-out devices (a first sending-out device 20A and a second sending-out device 20B) are provided, and three noncontact flowmeters 50 (a first noncontact flowmeter 50A, a second noncontact flowmeter 50B, and a third noncontact flowmeter 50C) are provided.

Note that, among the pipings which constitute the third channel 43, the piping disposed in the non-explosion-proof area 103 is referred to as "the third piping 43A," the piping disposed in the second explosion-proof area 102B is referred to as "the piping 43B," and the piping disposed in the first explosion-proof area 102C is referred to as "the piping 43C."

Moreover, in Embodiment 6, the change-over device 60 may be comprised of a three-way valve, or may be comprised of a two-way valve disposed in each of the piping 42B and the piping 43B.

The first sending-out device 20A may be configured to send out the paint to the paint gun of the painting robot 30, and, for example, it may be comprised of a gear pump. Moreover, the second sending-out device 20B may be configured to circulate the paint, and it may be comprised of a plunger pump.

In detail, the first sending-out device 20A is disposed in a part of the piping 42B downstream of the change-over device 60. The second sending-out device 20B is disposed in the piping 42C. Note that the second sending-out device 20B may be disposed in the piping 43C.

The first noncontact flowmeter 50A is disposed in the first piping 41A, the second noncontact flowmeter 50B is disposed in the second piping 42A, and the third noncontact flowmeter 50C is disposed in the third piping 43A. The first noncontact flowmeter 50A, the second noncontact flowmeter 50B, and the third noncontact flowmeter 50C may be comprised of noncontact flowmeters of the same type (e.g., ultrasonic flowmeters), respectively, or may be comprised of noncontact flowmeters of different types (e.g., ultrasonic flowmeter(s) and magnetic flowmeter(s)).

The robot system 100 according to Embodiment 6 configured in this way also has similar operation and effects to the robot system 100 according to Embodiment 1.

It is apparent for the person skilled in the art that many improvements or other embodiments of the present disclosure are possible from the above description. Therefore, the above description is to be interpreted only as illustration, and it is provided in order to teach the person skilled in the art the best mode that implements the present disclosure. The details of the structures and/or the functions may be changed substantially, without departing from the present disclosure.

Moreover, various inventions can be formed by a suitable combination of the plurality of components disclosed in the above embodiments.

INDUSTRIAL APPLICABILITY

The robot system of the present disclosure is useful because it can reduce the cost of the robot system provided with the painting robot and make the maintenance easier.

The invention claimed is:

1. A robot system, comprising:
a paint supply source disposed in a first explosion-proof area;
a sending-out device disposed in a second explosion-proof area;
a painting robot disposed in the second explosion-proof area;
a channel connecting the paint supply source to the painting robot through the sending-out device, and disposed so that a part thereof is located in a non-explosion-proof area, the non-explosion-proof area disposed between the first explosion-proof area and the second explosion-proof area; and
a noncontact flowmeter disposed in the channel and configured to detect a flow rate of a paint flowing through the channel.

2. The robot system of claim 1, wherein the channel has a first channel connecting the sending-out device to the painting robot, and wherein the noncontact flowmeter is disposed in a first piping constituting the first channel, such that the noncontact flowmeter disposed in the first piping is disposed in the non-explosion-proof area.

3. The robot system of claim 1, wherein the channel has a second channel connecting the paint supply source to the sending-out device, and wherein the noncontact flowmeter is disposed in a second piping constituting the second channel, such that the noncontact flowmeter disposed in the second piping is disposed in the non-explosion-proof area.

4. The robot system of claim 2, wherein the channel has a second channel connecting the paint supply source to the sending-out device, and a third channel, wherein a change-over device is disposed at an intermediate location of the second channel, wherein the third channel connects the change-over device to the paint supply source, and wherein the noncontact flowmeter is disposed in a third piping constituting the third channel, such that the noncontact flowmeter disposed in the third piping is disposed in the non-explosion-proof area.

5. The robot system of claim 1, further comprising a processor,
wherein the processor is programmed to receive flow rate of the paint detected by the noncontact flowmeter and as a result control operation of the sending-out device, and
wherein the processor is programmed to determine whether an abnormality occurs in the channel based on the flow rate of the paint detected by the noncontact flowmeter, and the existence of the operation of the sending-out device.

6. The robot system of claim 2, wherein the piping disposed in the non-explosion-proof area is made of metal.

* * * * *